United States Patent [19]

Mekanik et al.

[11] Patent Number: 5,638,244

[45] Date of Patent: Jun. 10, 1997

[54] APPARATUS AND METHODS FOR GENERATING UNINTERRUPTIBLE AC POWER SIGNALS

[75] Inventors: Fereydoun Mekanik, Bellingham; Donald C. Sorenson, Lynden; Gregory S. Zediker, Blaine; Thomas S. Osterman, Bainbridge Island, all of Wash.

[73] Assignee: Alpha Technologies, Inc., Bellingham, Wash.

[21] Appl. No.: 468,410

[22] Filed: Jun. 6, 1995

Related U.S. Application Data

[63] Continuation of Ser. No. 145,069, Oct. 29, 1993.

[51] Int. Cl.⁶ .................................................. H02H 3/00
[52] U.S. Cl. ........................... 361/62; 361/64; 361/93; 361/107
[58] Field of Search ....................... 361/62, 64, 66, 361/119, 93, 96, 18, 20, 21, 88, 107

[56] References Cited

U.S. PATENT DOCUMENTS

| | | | |
|---|---|---|---|
| 1,718,238 | 6/1929 | Kettering et al. | 290/35 |
| 2,007,415 | 7/1935 | Walker | 290/7 |
| 2,014,101 | 9/1935 | Bryan | 290/7 |
| 2,037,183 | 4/1936 | Strieby | 379/348 |
| 2,063,994 | 12/1936 | Frank et al. | 290/30 |
| 2,085,072 | 6/1937 | Bobe | 290/30 |
| 2,165,969 | 7/1939 | Humbert et al. | 290/30 |
| 2,240,123 | 4/1941 | Shoup et al. | 171/97 |
| 2,302,192 | 11/1942 | Dannheiser | 171/314 |
| 2,427,678 | 9/1947 | Laging | 290/4 |
| 2,688,704 | 9/1954 | Christenson | 290/4 |
| 2,856,543 | 10/1958 | Dixon et al. | 290/30 |
| 2,920,211 | 1/1960 | Gotoh | 290/30 |
| 3,064,195 | 11/1962 | Freen | 325/308 |
| 3,221,172 | 11/1965 | Rolison | 290/4 |
| 3,283,165 | 11/1966 | Bloch | 290/4 |
| 3,293,445 | 12/1966 | Levy | 307/66 |
| 3,305,762 | 2/1967 | Geib, Jr. | 322/4 |
| 3,339,080 | 8/1967 | Howald | 307/66 |
| 3,345,517 | 10/1967 | Smith | 290/4 |
| 3,348,060 | 10/1967 | Jamieson | 307/66 |
| 3,435,358 | 3/1969 | Rheinfelder | 330/220 |
| 3,458,710 | 7/1969 | Dodge | 290/30 |
| 3,525,035 | 8/1970 | Kakalec | 323/89 |
| 3,525,078 | 8/1970 | Baggott | 340/310 |
| 3,636,368 | 1/1972 | Sia | 307/64 |
| 3,678,284 | 7/1972 | Peters | 290/30 |
| 3,691,393 | 9/1972 | Papachristou | 290/30 |
| 3,859,589 | 1/1975 | Rush | 322/40 |
| 3,943,447 | 3/1976 | Shomo, III | 325/308 |
| 4,060,844 | 11/1977 | Davis et al. | 361/96 |
| 4,170,761 | 10/1979 | Koppehele | 330/166 |
| 4,460,834 | 7/1984 | Gottfried | 307/64 |
| 4,475,047 | 10/1984 | Ebert, Jr. | 307/66 |
| 4,686,375 | 8/1987 | Gottfried | 290/2 |
| 4,719,550 | 1/1988 | Powell et al. | 363/37 |
| 4,745,299 | 5/1988 | Eng et al. | 307/66 |
| 4,748,341 | 5/1988 | Gupta | 307/64 |
| 4,748,342 | 5/1988 | Dijkmans | 307/66 |
| 4,763,014 | 8/1988 | Model et al. | 307/66 |
| 5,010,469 | 4/1991 | Bobry | 363/37 |
| 5,057,698 | 10/1991 | Widener et al. | 307/66 |
| 5,172,009 | 12/1992 | Mohan | 307/46 |
| 5,185,536 | 2/1993 | Johnson, Jr. et al. | 307/66 |
| 5,198,698 | 3/1993 | Paul et al. | 307/66 |
| 5,198,970 | 3/1993 | Kawabata et al. | 363/37 |
| 5,302,858 | 4/1994 | Folts | 307/66 |

FOREIGN PATENT DOCUMENTS 2005118  4/1979  United Kingdom.

*Primary Examiner*—Jeffrey A. Gaffin
*Assistant Examiner*—Stephen Jackson
*Attorney, Agent, or Firm*—Hughes, Multer & Schacht, P.S.

[57] ABSTRACT

A broadband communications network having an uninterruptible power supply. The power supply has one input connected to AC line voltage and another input connected to a gas powered electrical generator. The power supply contains an uninterruptible power supply module having a controlled ferroresonant transformer and a battery. The power supply also contains a bypass module having a controlled ferroresonant transformer. Switches are provided to allow either of the inputs to be connected to either the UPS module or the bypass module for the generation of power signals for supplying power to the broadband communications network.

25 Claims, 23 Drawing Sheets

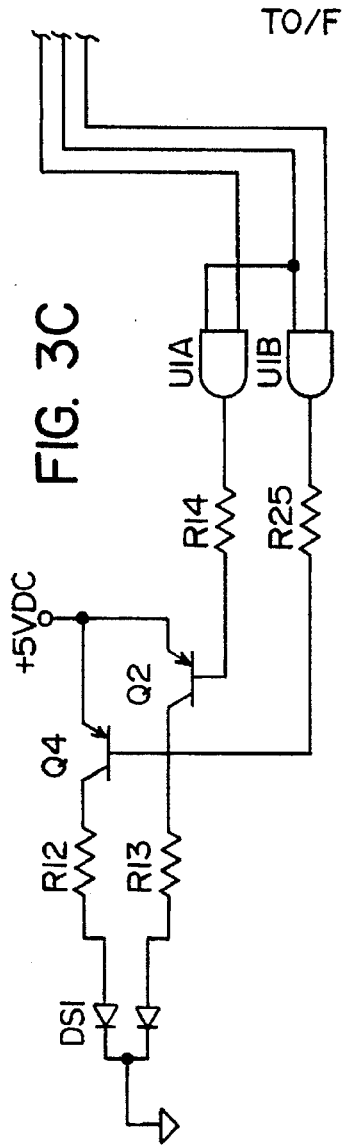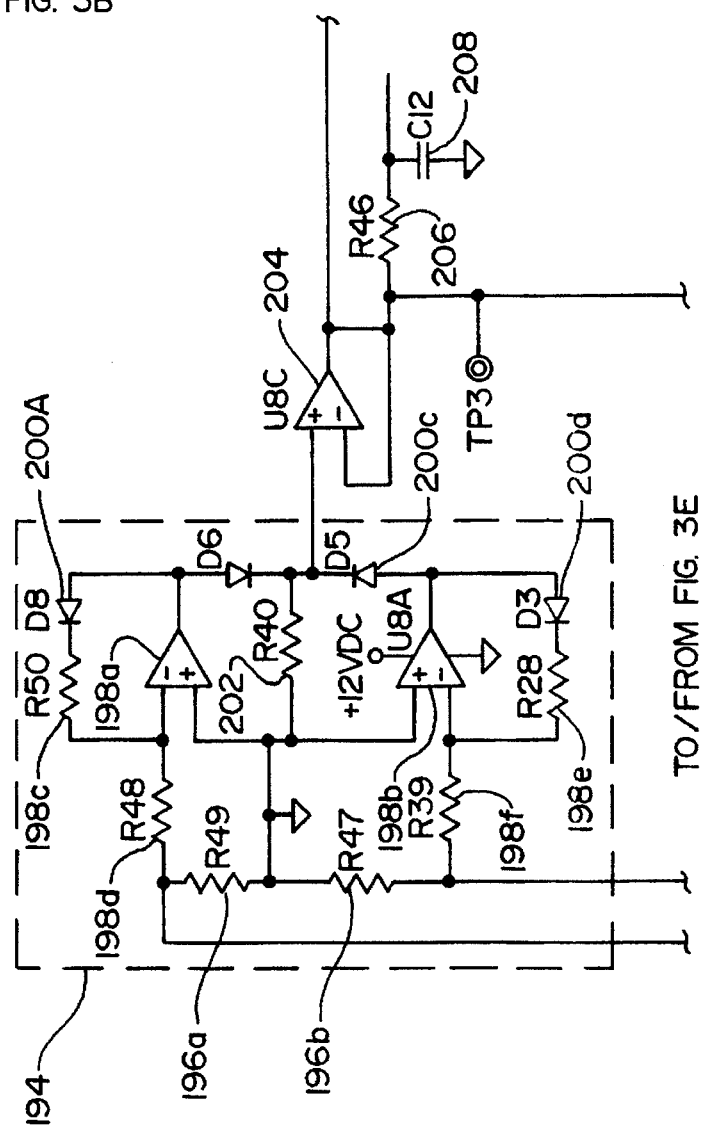

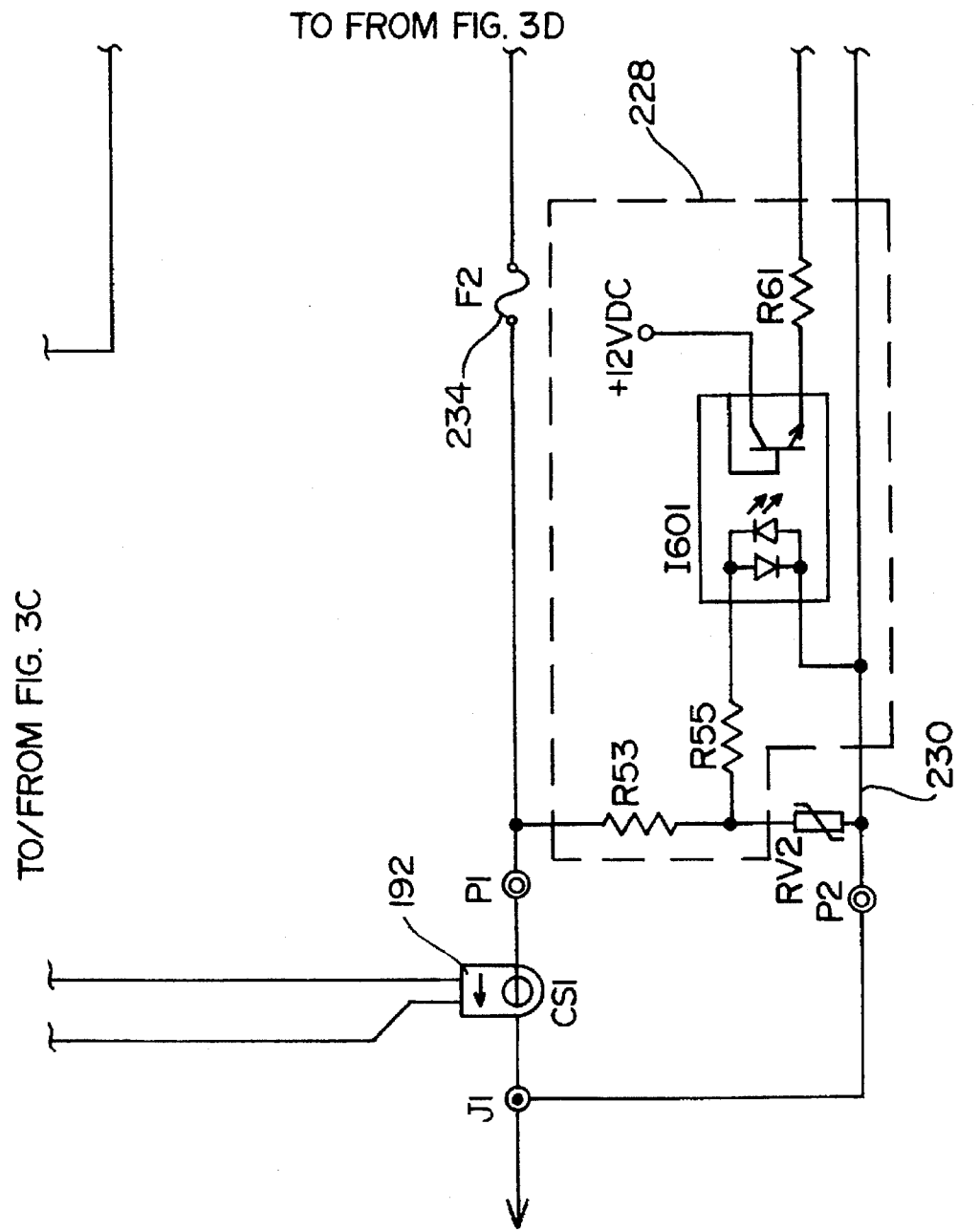

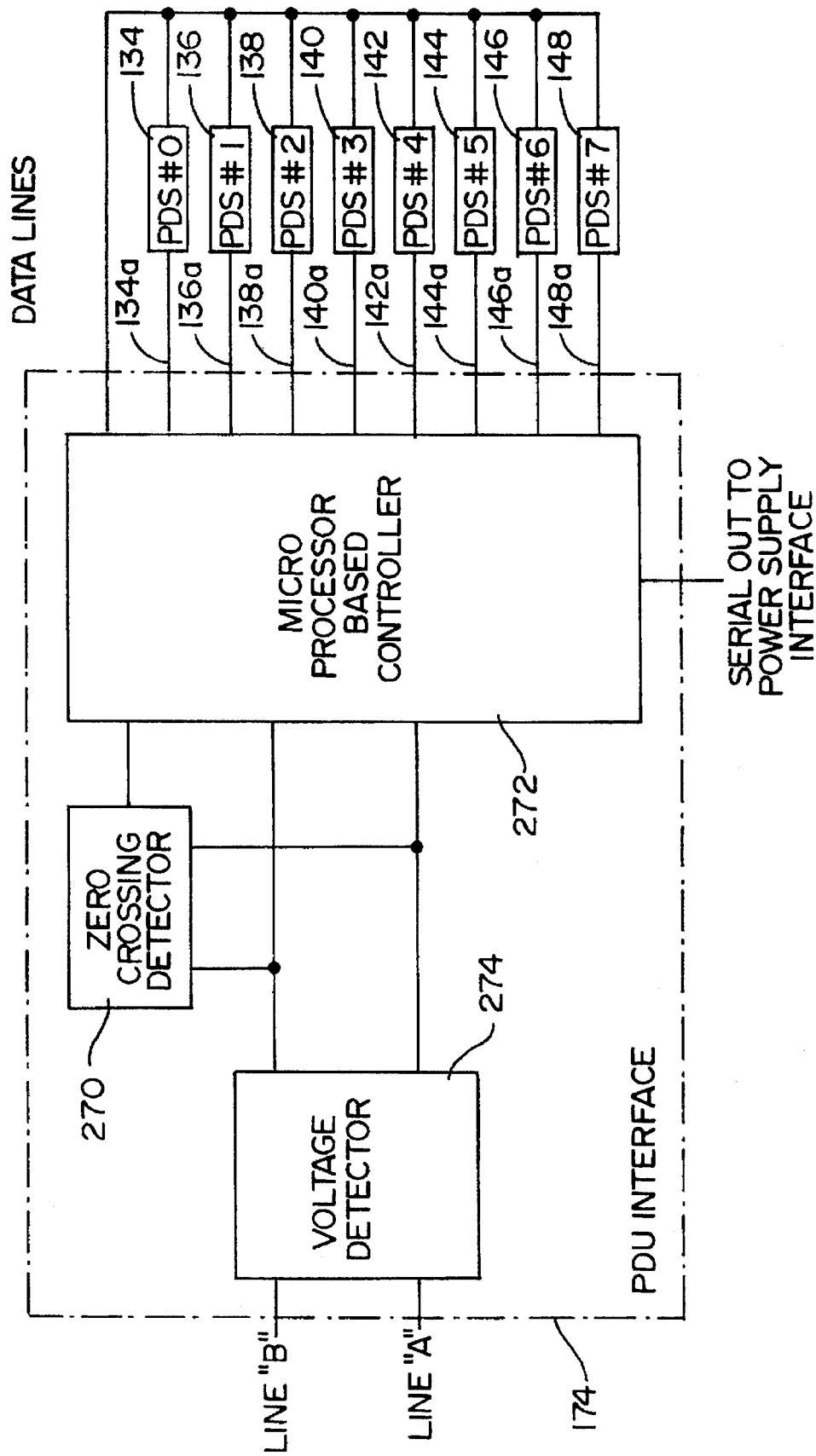

FIG. 5C
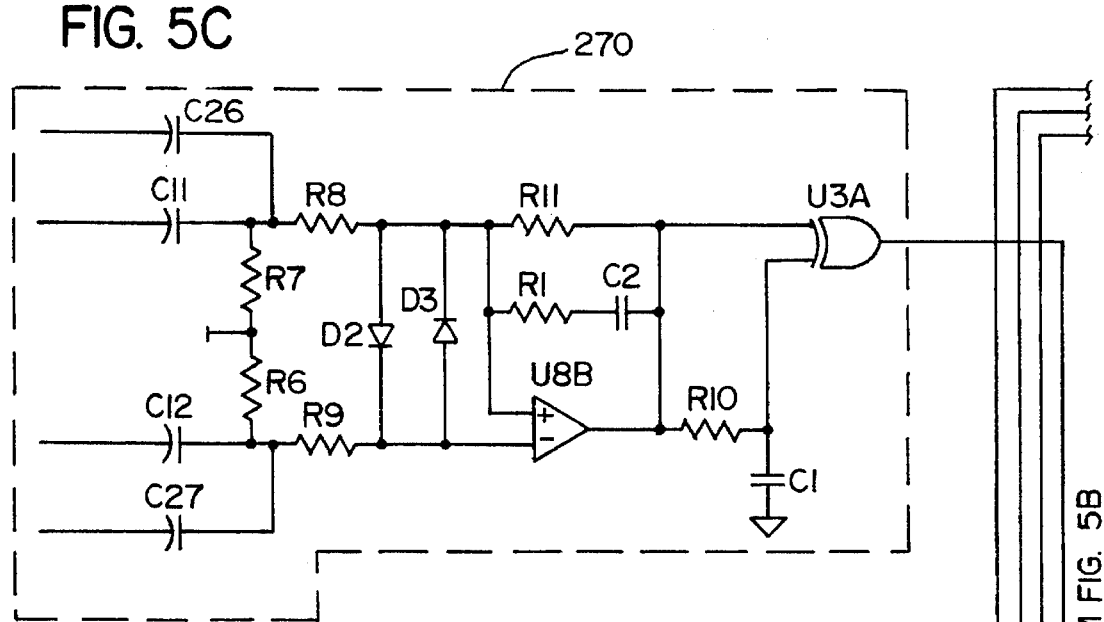
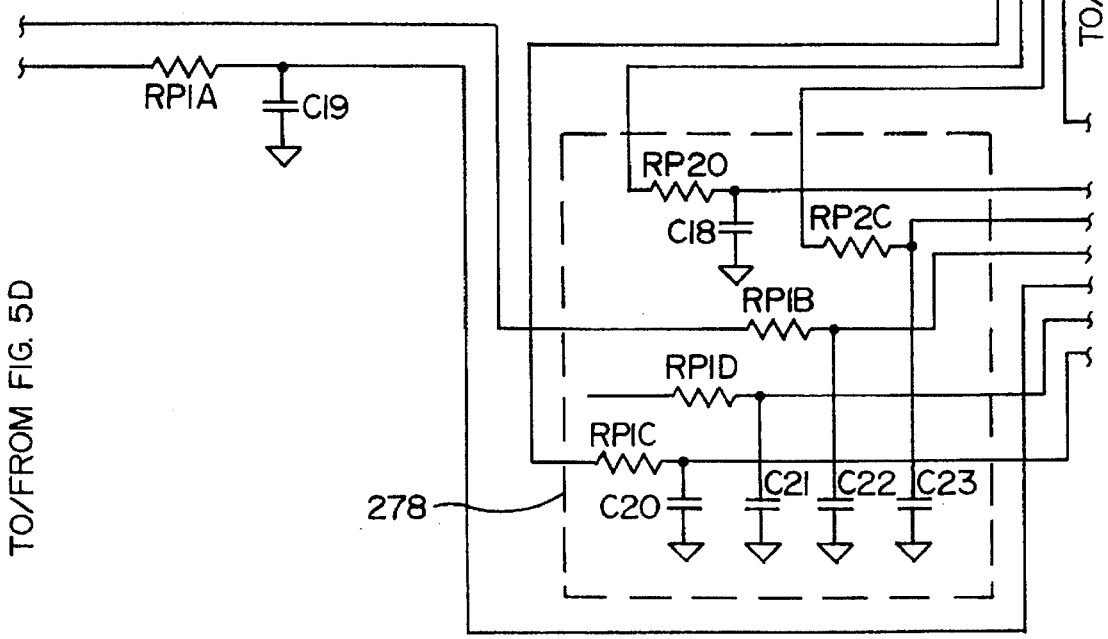
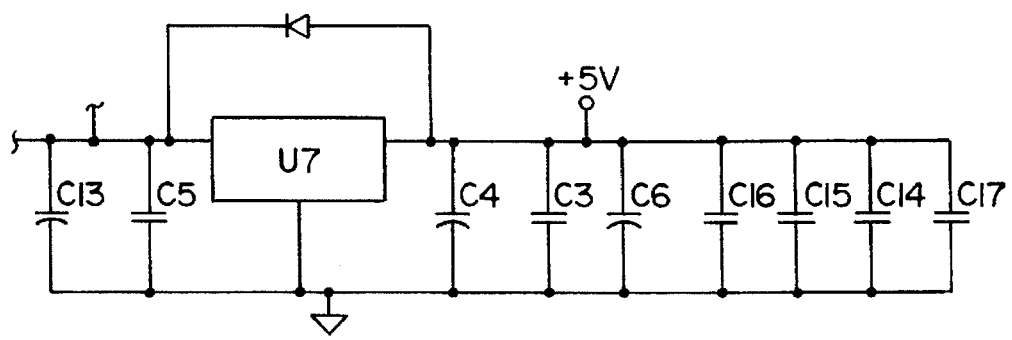

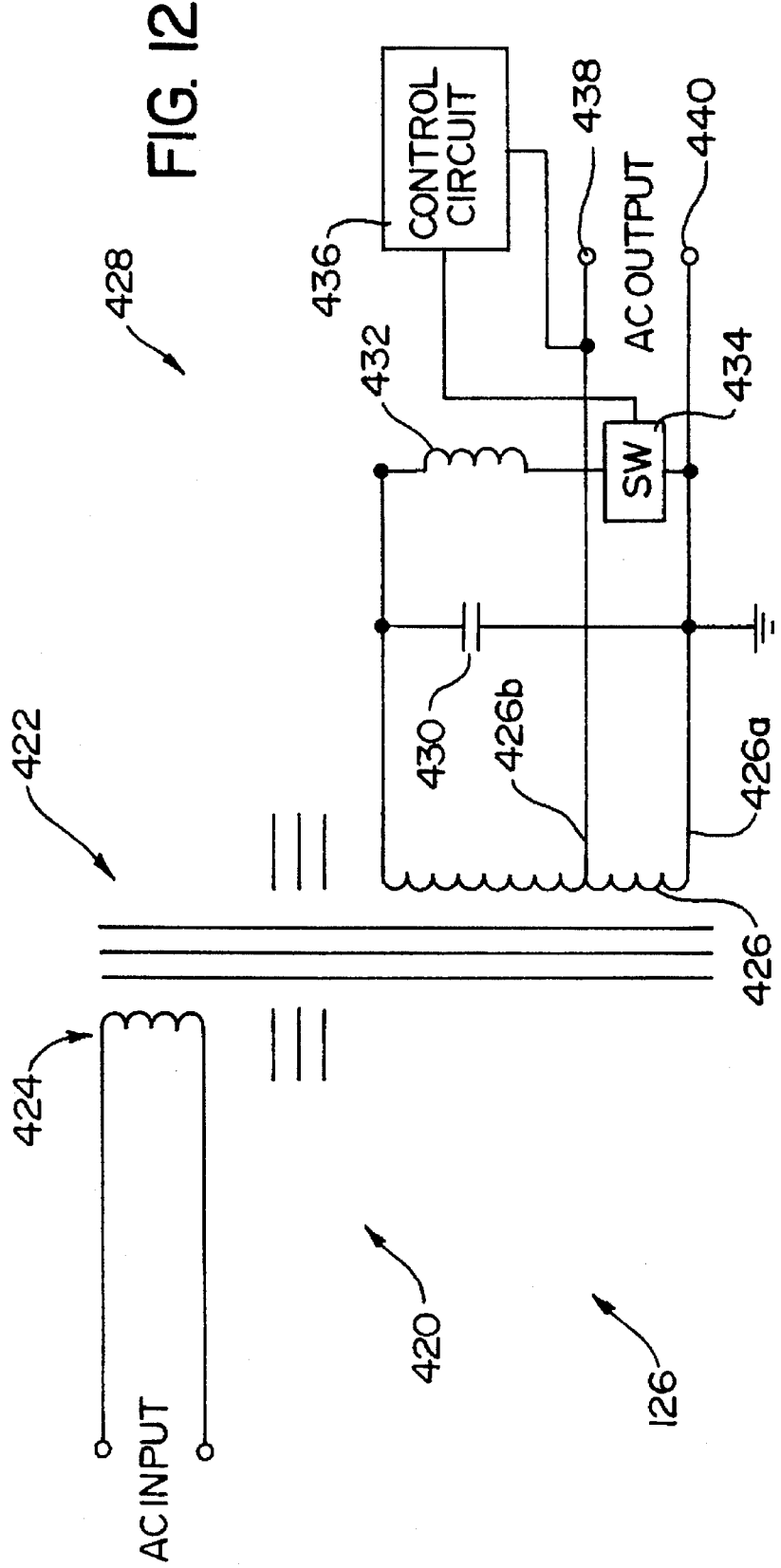

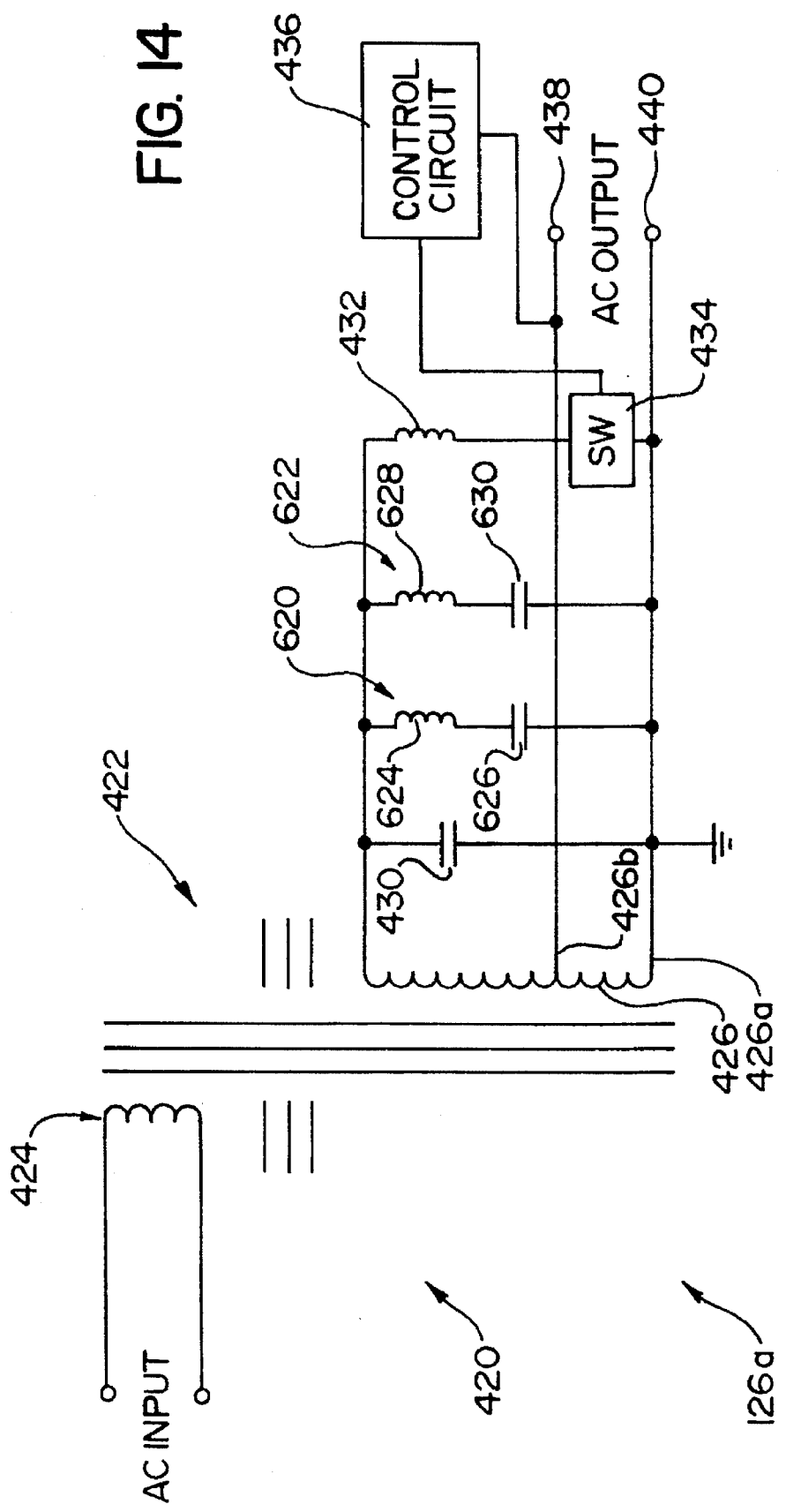

APPARATUS AND METHODS FOR GENERATING UNINTERRUPTIBLE AC POWER SIGNALS

This is a continuation of copending application Ser. No. 08/145,069 filed Oct. 29, 1993.

TECHNICAL FIELD

The present invention relates to uninterruptible power supplies and, more particularly, to apparatus and methods for generating AC power signals for use in communications networks such that disruptions in communications due to power failures are substantially reduced.

BACKGROUND OF THE INVENTION

The present invention is of particular importance when used in a cable-based network for distributing video, digital, and conventional telephony signals, and that application will be described in detail herein. However, the basic concepts of the present invention have broader application to other networks or systems where power disruption at remote sites can cause significant problems; several such networks and systems will be briefly described below to illustrate the scope of the present invention. Accordingly, the scope of the present invention should be determined with reference to the claims appended hereto rather than the following detailed description.

The basic technology currently exists to provide broadband digital communications capabilities to the mass market. However, the use of broadband digital communications networks at this time is largely limited to point to point networks designed for large commercial customers. This is because the communications infrastructure available to serve small commercial and residential customers is comprised largely of twisted pair wire for carrying analog telephone signals and/or coaxial cable for carrying analog television signals. This infrastructure as currently implemented does not allow two-way, broadband digital communications It is anticipated that, eventually, the mass market will be served by a broadband communications network based on fiber optic cable. However, substantial time and money will be required to replace the twisted pair wire and coaxial cable infrastructure currently serving the end customer with a fiber optic infrastructure. Accordingly, a fiber optic based communications system may not be available to the mass market for some time.

In the meantime, plans are being made for broadband communications networks based on a hybrid solution in which fiber optic cable is used as a backbone to carry signals to the twisted pair and coaxial cable currently serving the end user. The fiber optic portion of such a network can then be expanded incrementally throughout the distribution plant until it eventually extends to the end user.

As the point at which such a hybrid network is converted from fiber optic cable to coaxial cable and/or twisted pair wire extends outwardly from the central office to the end user, problems with disruption of the system caused by power outages similarly become decentralized. The existing telephony solutions to power outages are not applicable to providing power to coaxial cable networks. Further, the standards for preventing disruption of services in cable TV networks are not as stringent as those for basic communications services. While disruption of cable TV transmission caused by a power outage is not a major problem, the problems caused by disruptions to a communications system can be severe. The existing solutions for providing emergency power in coaxial cable networks are thus also inadequate because they are not designed to meet the higher standards required for preventing disruptions of basic communications systems.

The need thus exists for a system for generating emergency power signals that can be used in a hybrid fiber optic/coaxial cable based communications system and which meets the standards required for preventing disruptions of basic communications systems.

OBJECTS OF THE INVENTION

It should be clear from the foregoing that a major object of the present invention is to provide broadband communications network having an uninterruptible power supply.

Another important, bun more specific, object of the present invention is to provide apparatus and methods for generating AC power signals that have desirable combination of the following characteristics:

a. can be remotely monitored and controlled;

b. allows the use of motor driven electrical generators as an alternate source of electrical power; and c. can be adapted to conform to a wide variety of network schemes.

SUMMARY OF THE INVENTION

A communications network comprising a source a main stream of data and plurality of network power nodes geographically isolated from the source of the main data stream. Each power node comprises broadband multiplexer for receiving the main stream of data and generating a plurality channels of data from the main data stream. Each power node also comprises a power supply for providing electrical power to allow the transmission of the plurality of channels of data to end users. In the exemplary system described herein, this power is an AC power signal, and the channels of data re distributed over coaxial cable.

The power supply itself comprises a primary source of electrical power and an alternate source of electrical power. The alternate source of electrical power comprises a motor driven electrical generator.

The power supply also comprises an uninterruptible power supply module comprising a ferroresonant transformer. The uninterruptible power supply has a battery and automatically switches to battery power when power through the UPS module is interrupted. The power supply also has a bypass module comprising a ferroresonant transformer.

The power supply also has a plurality of switches to allow the electrical power provided by the power supply to be obtained from the primary source through the uninterruptible power supply module, from the alternate source through the uninterruptible power supply module, the primary source through the bypass module, or from the alternate source through the bypass module.

The power supply also contains a control/monitor module that allows the switches to be remotely controlled and the operational status of the power supply components to remotely monitored. The control/monitor module can communicate with the source of the main stream of data to allow the power supply to be controlled and monitored from a remote location.

The invention as describe provides a stable power supply that employs a number of redundant methods of generating power to greatly minimize the possibility that power to the communications network is lost. In particular, the use of controlled ferroresonant transformers in the UPS module and the bypass module allows the use of relatively unstable sources of alternate energy such as motor driven electrical generators.

BRIEF DESCRIPTION OF THE DRAWINGS

FIG. 4 is a simplified block diagram showing the basic components of the power distribution interface and the power distribution switch such as is shown in FIG. 3;

FIG. 12 is a simplified block diagram of the bypass module shown in FIG. 2;

FIG. 14 is a simplified block diagram of a bypass module modified to generate generally sinusoidal power signals.

DETAILED DESCRIPTION OF THE INVENTION

Figure 1:
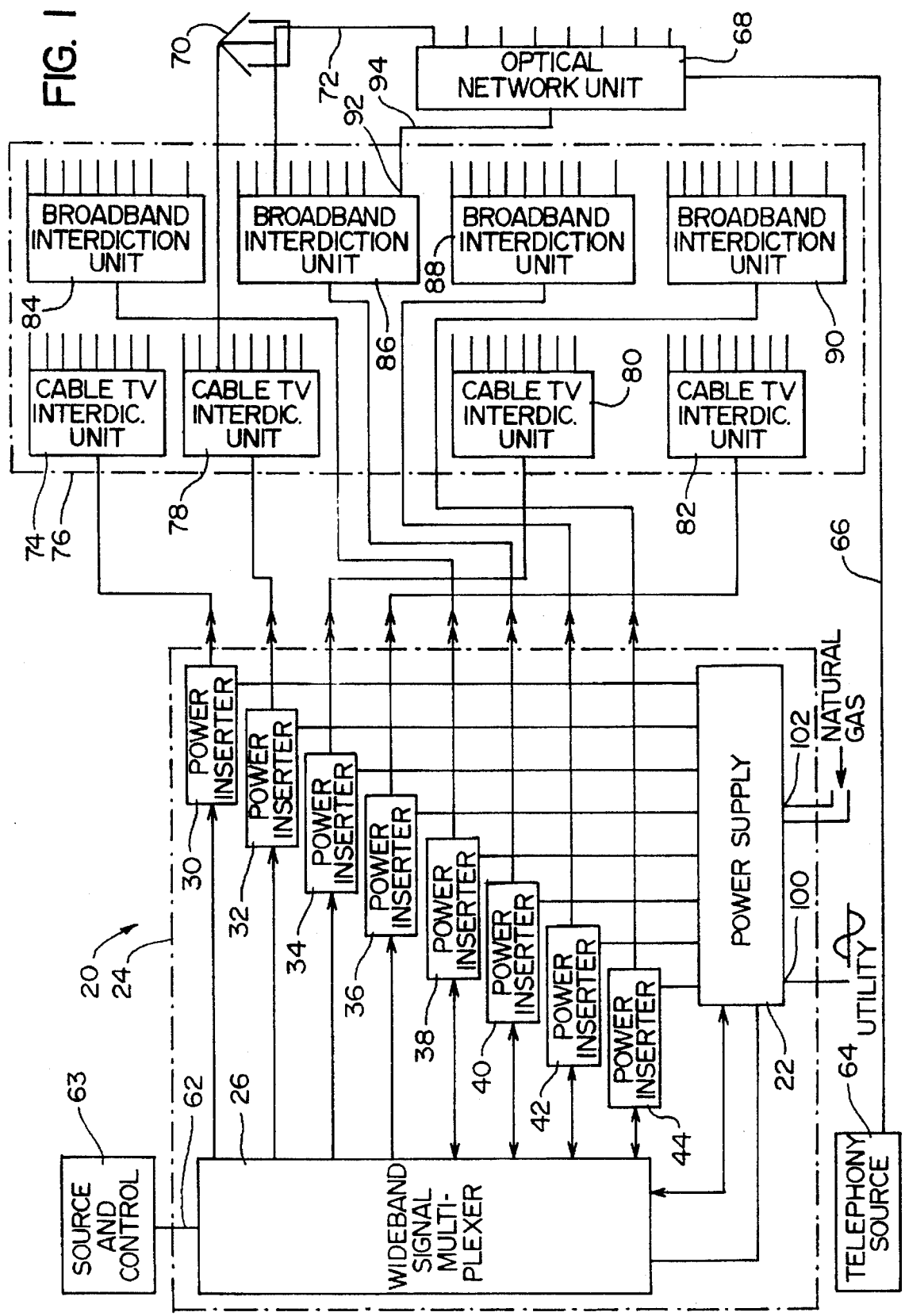
FIG. 1 is a simplified block diagram of a typical communication network employing a power supply constructed in accordance with, and embodying, the principals of the present invention.

Referring now to the drawing, shown at 20 in FIG. 1 is a broadband network communications system incorporating a power supply 22 constructed in accordance with, and embodying, the principles of the present invention. The communications system 20 will be initially described herein to the extent necessary for a complete understanding of the present invention. After the discussion of the communications system 20, a detailed discussion of the power supply 22 will be presented.

I. Typical Operating Environment

Shown by dot-dashed lines in FIG. 1 is a power node 24 of the system 20. The communications system 20 can and will often contain hundreds of power nodes such as that depicted at nodes 24. Each power node will serve approximately 400 system subscribers and will be physically located in a central location relative to the subscriber's residences. Ordinarily, a power node such as that indicated at 24 in FIG. 1 will serve approximately a one-square mile geographic area.

The power node 24 basically comprises the power supply 22, a wideband signal multiplexer 26, and first through eighth power inserters 30–44.

The wideband signal multiplexer 26 is connected by a bundle 62 of fiber optic cables to a video/BB source and control station 64. The video/BB source and control station 64 is normally located geographically distant from the power node 24 and will be similarly connected to a number of other power nodes in the network.

In the exemplary network topology shown at 20 in FIG. 1, the video source/control station 64 will be a headend for providing video signals, a switching station for broadband signals in a larger broadband communications network, and the central control location for the control of the power nodes connected thereto. Of particular importance to the present invention are the control capabilities of the video/BB source and control station 63, and these will be discussed below to the extent necessary for a complete understanding of the present invention.

The source of telephony signals in the network 20 is indicated at 64 in FIG. 1. As will become apparent from the following discussion, the distribution of telephony signals is separate from that of video/BB signals; however, the power supply 22 provides power to both of these networks. Telephony signals are distributed over a combination of fiber optic cables and twisted pair wire. Video/BB signals are distributed over a combination of fiber optic cables and coaxial cables.

Referring initially to the telephony portion of the network 22, the telephony source 64 is a switching node in a conventional telephone network and is also normally some distance away from the power node 24. As shown in FIG. 1, this telephony source 64 is connected by one or more fiber optic cables as is indicated at 66 to a number of ONUs such as an ONU 68. The ONU 68 may be connected by twisted pair wire to up to eight subsribers' residences; one such twisted pair connection between the ONU 68 and a typical subscriber's residence 70 is shown at 72 in FIG. 1. The ONU 68 contains circuitry to convert the fiber optic signals to conventional analog telephony signals appropriate for transmission over twisted pair wire.

Referring now to the video/BB portion of the network 22, the wideband signal multiplexer 26 converts fiber optic signals into the video and broadband signals appropriate for transmission over coaxial cables. In the exemplary network 22, the translator 26 produces four video signals that are sent to the power inserters 30, 32, 34, and 36 and four broadband signals that are sent to the power inserters 38, 40, 42, and 44.

Within the power node 24 shown in FIG. 1, connections that carry information signals such as the video and broadband signals are shown with arrows indicating the direction the information travels, connections that carry power signals are shown without arrows, and connections that carry both power and information signals are shown by double arrows.

With this in mind, it can be seen that the video and broadband digital signals travel out of the wideband signal multiplexer 26. Further, the power supply 22 provides power signals to the power inserters 30–44. The power inserters 30–36 mix power signals with video signals and the power inserters 38–44 mix power signals with broadband signals. The combined power and information carrying signals will be referred to herein as combined signals.

Eight combined signals thus emerge from the power node 24 and are distributed over a distribution network 74 comprising interdiction units 76–90. Along the way, the combined signals are passed through coaxial cables configured with repeaters the prevent the information carrying portion of the combined signals from being substantially degraded. Such repeaters are well-known in the art and will not be discussed in detail herein. For a complete understanding of the present invention, however, it should be understood that these repeaters operate basically as follows. A repeater initially separates the power and information carrying portions of the combined signals. The repeater then uses the power portion of the combined signal to amplify the information portion thereof and then mixes the amplified information signal back together with the power signal for further transmission through the network 74.

Of the eight total combined signals leaving the power node 24, four combined signals carry video signals and power signals and travel on coaxial cables to CATV interdiction units 74, 76, 78, and 80, while four combined signals carry BB signals and power signals over coaxial cables to four BB interdiction units 82, 84, 86, and 88. Each of the CATV interdiction units is paired with a corresponding BB interdiction unit, resulting in four pairs of interdiction units. In particular, the following interdiction units are paired together: CATV interdiction unit 76 with BB interdiction unit 84; CATV interdiction unit 78 with BB interdiction unit 86; CATV interdiction unit 80 with BB interdiction unit 88; and CATV interdiction unit 82 with BB interdiction unit 90. Each of these interdiction unit pairs will serve a geographically distinct area.

The CATV and BB interdiction units are constructed and operate in basically the same manner. However, the BB interdiction units are nine channel units that have a power pass-through port. The power pass-through port passes only the power signal for providing power to ONUs distributed through the network 20. Shown at 92 in FIG. 1 is a pass-through port connected by a coaxial cable 94 to the ONU 68.

The distribution network 74 contains, as is required by the number and locations of subscribers to be served, a number of conventional repeater amplifiers to allow the video and broadband digital signals to be distributed to a large number of subscriber's residences, the residence depicted 70 being but one of many served by the network 74. This portion of the network is conventional and will not be described in detail herein.

From the foregoing, it should be clear that the network 20 is capable of providing to each subscriber a telephony signal, a video signal, and a broadband digital signal.

Referring now back to the power node 24, it can be seen that the power supply 22 supplies power to the wideband signal multiplexer 26. The power supply 22 is also in communication with the wideband signal multiplexer 26 to allow information to be transferred between the power supply 22 and the video/BB source and control station 64.

Further, FIG. 1 shows that the power supply 22 comprises a utility AC line voltage inlet 100 and a natural gas inlet 102. As will be discussed in further detail below, the power supply 22 can generate power signals based on either the utility AC line voltage through the line inlet 100 or natural gas through the gas inlet 102.

II. Basic Operation of Power Supply

Figure 2:
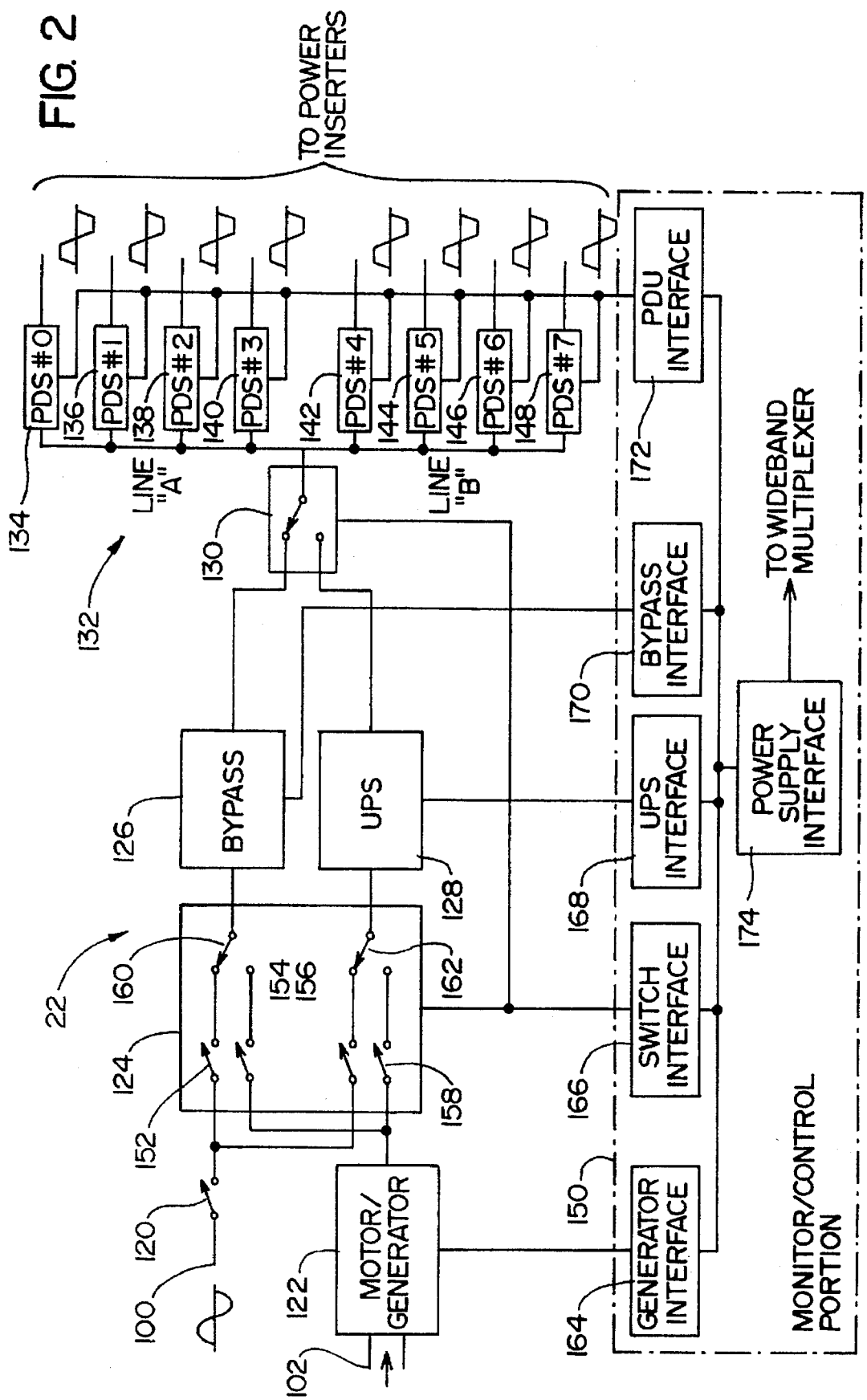
FIG. 2 is a block diagram of the power supply depicted in FIG. 1.

Referring now to FIG. 2, the construction and operation of the power supply 22 will be described in further detail. The power supply 22 basically comprises a line disconnect switch 120, a motor/generator module 122, a source select switch array 124, a bypass module 126, an uninterruptible power supply (UPS) module 128, an output select switch 120, a power distribution unit (PDU) 132 comprising first through eighth power distribution switch boards 134–148, and a monitor/control portion 150. The source select switch array 124 comprises first through fourth switches 152–158 and first and second transfer switches 160 and 162. The monitor/control portion 150 comprises a generator interface 164, a switch interface 166, a UPS interface 168, a bypass interface 170, a PDU interface 172, and a power supply interface 174. The line inlet 100 and the gas inlet 102 are also both shown in FIG. 1.

The power supply 12 operates basically as follows. Under normal operating conditions with the line signal present, the line signal is applied through the line disconnect switch 120 to the first and third switches 152 and 156 of the source select switch array 124. Under normal conditions, the first, second, and fourth switches 152, 154, and 158 are opened and the third switch 156 is closed. The second transfer switch 162 is operated to allow the line AC signal to pass to the UPS module 128. The line signal thus enters the UPS module 128, which is operating in "line mode" under normal conditions. The UPS module 128 converts the line signal, as will be described in further detail below, from a 60 Hz, 120 volt sinusoidal waveform to a regulated 60 Hz, 60 Vrms waveform having flattened peaks. The 60 Hz, 60 Vrms waveform obtained is appropriate for powering RF amplifiers used as repeaters in coaxial cable networks and is referred to herein as a power signal.

The power signal so obtained is then passed through the output select switch 130, which, under the assumed normal conditions, is operated to allow the output of the UPS module 128 to pass through to the PDU 132. The power signal is then divided into lines "A" and "B" which are each further divided into four lines and distributed to the power distribution switch boards 134–140 and 142–148, respectively. The power supply signals then pass through these switches 134–148 where they are connected to the power inserters 32–44 as described above.

Should the utility line signal be interrupted, the UPS module will automatically switch from line mode into "inverter mode" in which a power signal is generated by batteries. As will be described in detail below, the UPS module 128 will also notify the UPS interface 168 when the utility line signal is interrupted. If the line signal interruption is momentary, the UPS module will automatically switch back to line mode and notify the UPS interface 168.

When the UPS module 128 goes into inverter mode and line voltage is not reinstated, the UPS interface 162 will notify the power supply interface 174. The power supply interface 174 will direct the generator interface 164 to start the motor/generator 122. The motor/generator 122 will generate an AC signal that will be referred to herein as the alternate line signal. The alternate line signal, like the utility line signal, is ideally a 60 Hz/120 volt AC signal. The power supply interface then instructs the switch interface 166 to open the third switch 156, close the fourth switch 158, and operate the transfer switch 162 to allow the alternate line signal to reach the UPS 128. The UPS 128 detects the alternate line signal and changes from inverter mode back into line mode.

Should repair or replacement of the UPS module be required, both of the third and fourth switches 156 and 158 may be opened and one of Eke first and second circuit breakers 152 and 154 may be closed to bypass the UPS module. In this case, the line voltage can obtained either through the input circuit breaker 120 or from the motor/generator 122, and the first transfer switch is operated accordingly.

In either case, a 60 Hz/120 volt AC signal is applied to the bypass module 126, which converts this signal into a power signal as described above. The output select switch 130 is operated such that the power signal generated by the bypass module 126 is divided into the line "A" and line "B" signals described above.

The power supply 22 thus can generate power signals in five different ways: (a) utility line voltage through the UPS module 128; (b) motor/generator line voltage through the UPS module 128; (c) battery power from the UPS module 128 operating in inverter mode; and (d) utility line voltage through the bypass module 126; and (e) motor/generator line voltage through the bypass module 126.

The monitor/control portion 150 of the power supply 22 allows the process described above to be remotely monitored and controlled. In particular, as will be described in further detail below, the power supply interface module 174 contains circuitry that maintains a status array containing certain critical states and values related to the power supply 22. To maintain this status array and allow remote control of the power supply 22, the power supply interface module 174 is in communication with the generator, switch interface, UPS interface, bypass interface, and PDU interface modules 164–172. These modules 164–172 are in communication with sensors and control points arranged throughout the power supply 22 to collect the information required to maintain the status array.

The power supply interface 174 is also in communication with the video/BB source and control station 64 through the wideband signal multiplexer 26. Thus, if any values within the status array change, such changes are transmitted to the control station 64 to allow appropriate action to be taken. The appropriate action may include sending control signals from the control station 64 to the power supply interface 174 and/or sending a repair crew to the node 24.

III. Details of Operation and Construction of Power Supply

With the foregoing general understanding of the construction and operation of the power supply 22, the details of operation thereof will now be presented. In the following discussion, the power distribution switch boards 134–148, power distribution unit interface 172, and power supply interface 174 will be described in detail. The generator, switch, UPS, bypass, and power supply interfaces 164–170 and 172 will not be discussed individually in detail herein; instead, a general model for the implementation of each of these interfaces will be presented. Following that will be detailed discussions of the UPS module 128 and the bypass module 126. Finally, a short discussion of a minor modification that can be made to the UPS module 128 and the bypass module 126 to render the power supply 22 appropriate for other operating environments.

a. Power Distribution Switch Boards

Figure 3A:
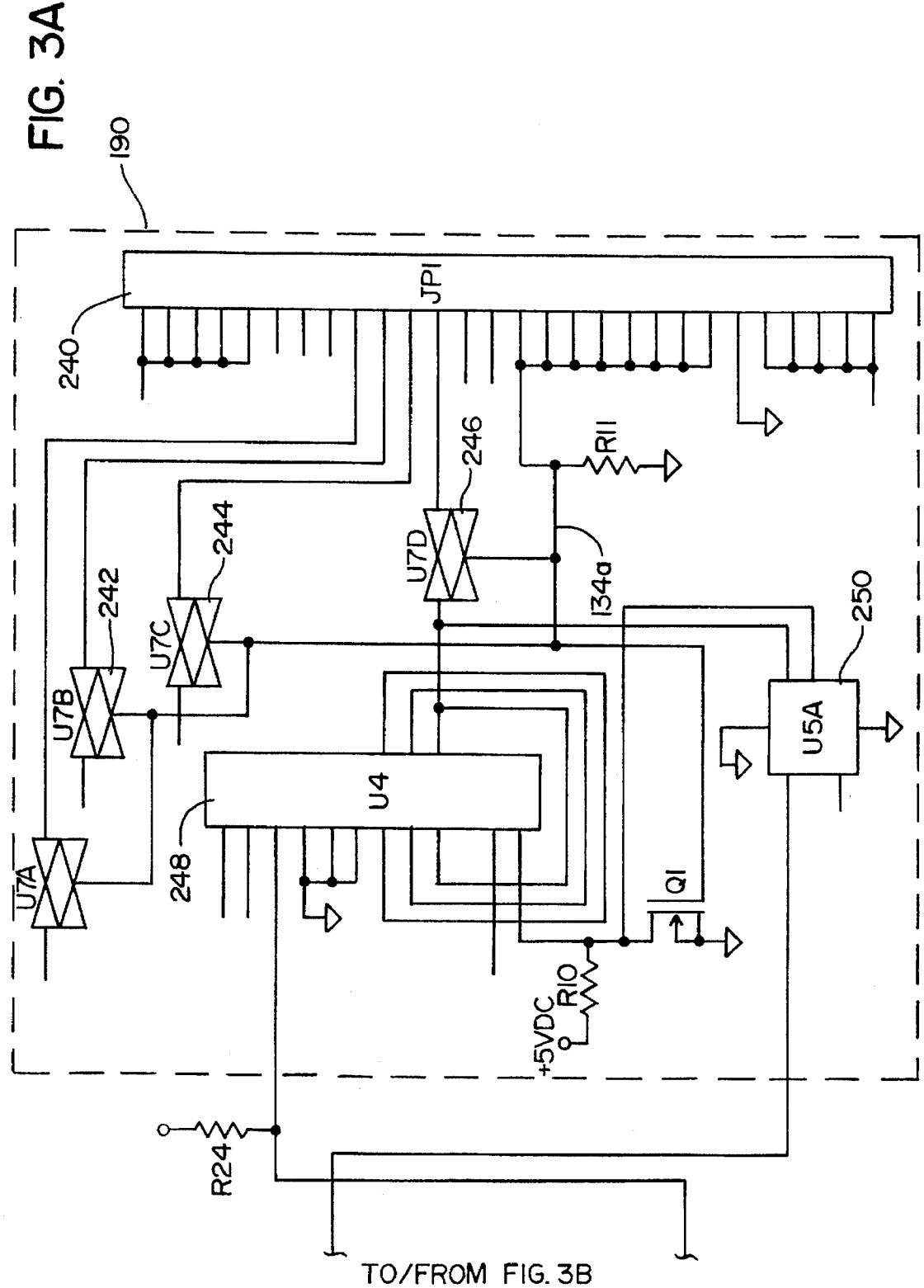
FIG. 3 is a detailed circuit diagram of a power distribution switch contained in the power supply shown in FIG. 2.
Figure 3B:
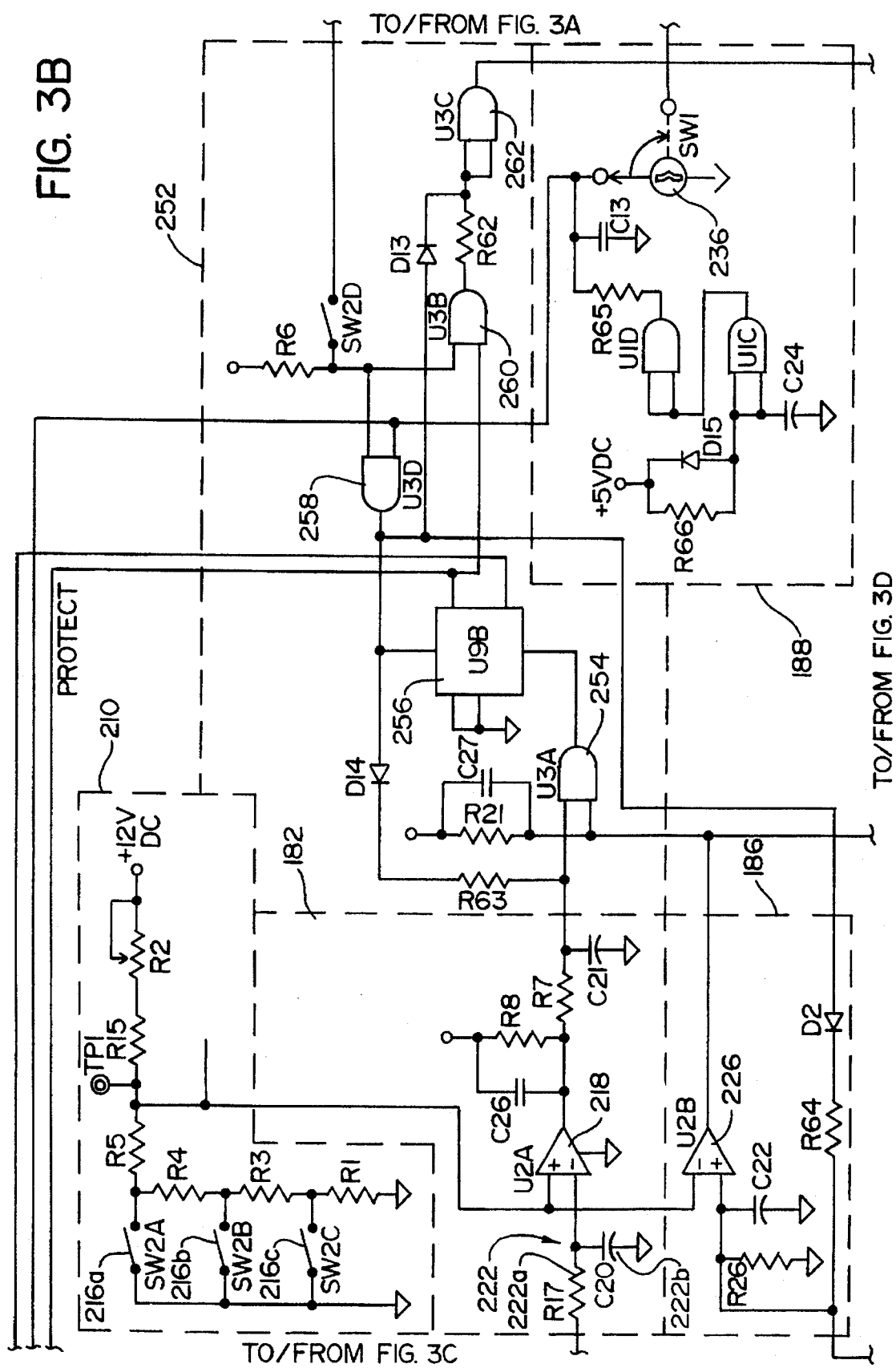
Figure 3D:
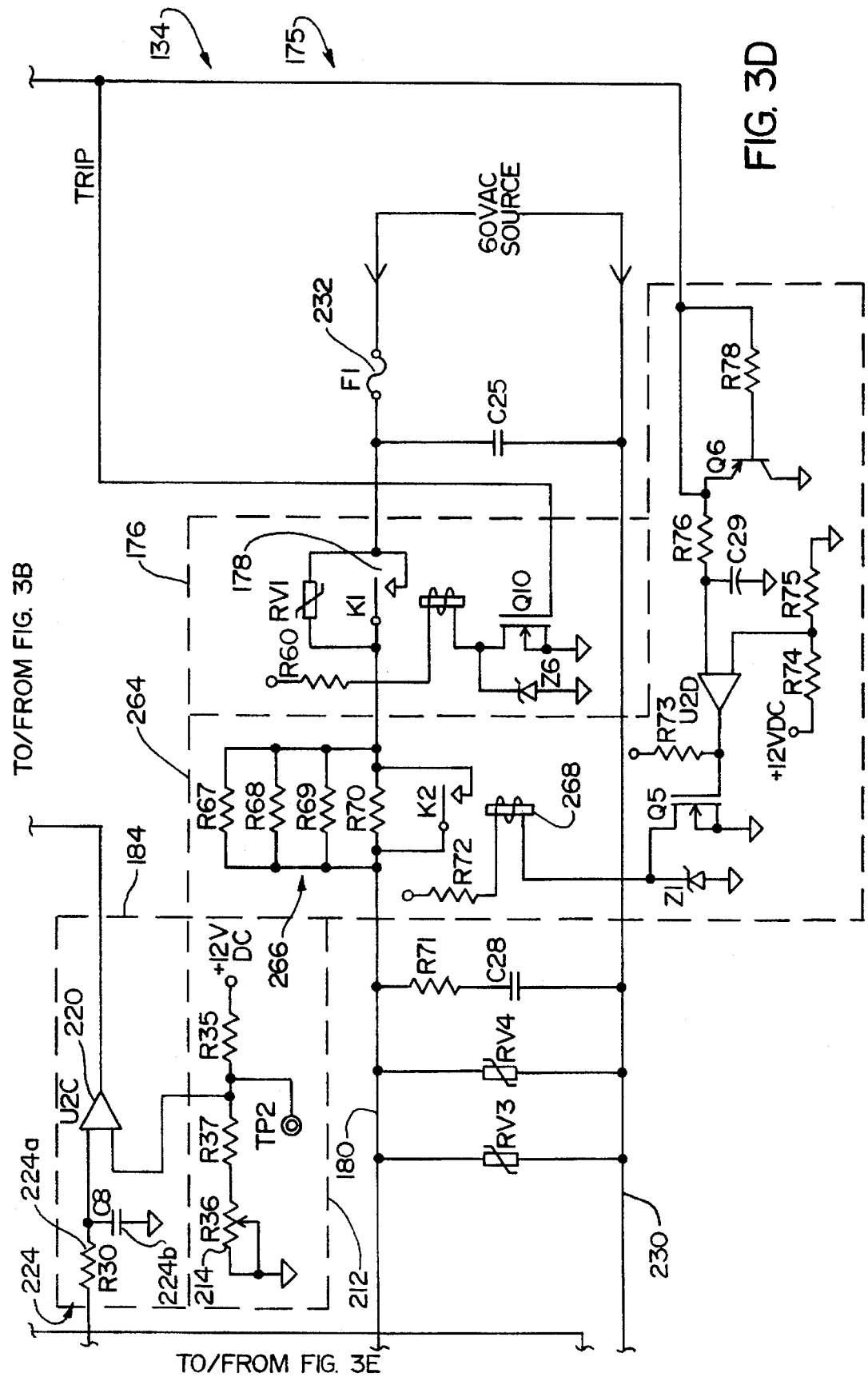

Referring now to FIG. 3, a detailed description of the power distribution switch board 134 will be provided. This switch board 134 operates in the same manner as the switch boards 136–148, so only the switch board 134 will be discussed in detail herein.

One of the power signals on the line "A" described above passes through the switch board 134 as indicated at 17 in FIG. 3. The primary purpose of the switch board 134 is to interrupt the power signal passing therethrough when a fault occurs.

In particular, shown at 176 in FIG. 3 is a switch circuit containing a switch 178 that, when opened, prevents current flow through a conductor 180 to prevent the power signal from passing through the board 134. The switch 178 is opened by a TRIP signal generated: (a) when a fault is detected by a slow current limit circuit 182, fast current limit circuit 184, and voltage sense circuit 186; (b) when an operator at the power supply 22 operates a key switch circuit 188; or (c) under control of the control station 64 through an interface multiplexer circuit 190.

The current limit circuits 182 and 184 will be discussed first. The slow current limit circuit 182 is designed to cause the TRIP signal to be generated when a relatively low level over-current condition (e.g. seven amps) exists for a relatively long period of time (e.g., three seconds). The fast current limit circuit 184 is designed to cause the TRIP signal to be generated when a relatively high level over-current condition (e.g. seventy amps) exists for a relatively short period of time (e.g., less than a second).

Current through the conductor 180 is detected by a current transformer 192 and measured by a precision rectifier 194. In particular, a DC voltage corresponding to the current through the conductor 180 is generated by measuring the voltages across current sense resistors 196a and 196b, amplifying these voltages with op amps 198a and 198b, and rectifying the outputs of the op amps 198a and 198b with rectifying diodes 200a, 200b, 200c, and 200d. This voltage will be referred to as the current sense voltage. Resistors 198c, 198d, 198e, and 198f set the gain of the op amps 198a and 198b to two. A resistor 202 is a load for preventing peak detection. The output of the precision rectifier 194 is buffered by a buffer amplifier 204 and filtered by a resistor 206 and a capacitor 208.

The current sense voltage next enters the slow current limit circuit 182 and fast current limit circuit 184. In the slow current limit circuit 182, the current sense voltage is compared with a slow threshold voltage set by a slow select circuit 210. In the fast current limit circuit 184, the current sense voltage is compared with a fast threshold voltage set by a fast select circuit 212. The fast threshold voltage is set once at the factory by adjusting a variable resistor 214, while the slow threshold voltage may be changed at any time by operating switches 216a, 216b, and 216c. The comparison is performed in the slow current limit circuit 182 by a comparator 218 and in the fast current limit circuit 184 by a comparator 220. A resistor 222a and a capacitor 222b form a delay circuit 222 for setting the reaction time of the slow current limit circuit 182, while a delay circuit 224 that sets the reaction time of the fast current limit circuit 184 is formed by a resistor 224a and a capacitor 224b. The outputs of the comparators 218 and 220 go low to generate SLOW TRIP and FAST TRIP signals, respectively, whenever the current magnitude and duration limits are exceeded.

The voltage sense circuit 186 will now be discussed. This circuit 186 contains a comparator 226 the output of which goes low to obtain a VOLTAGE TRIP signal whenever a voltage detecting circuit 228 indicates that no voltage is present between the conductor 180 and a conductor 230 that carry the power signal. As only the presence or absence of voltage is being detected, the reference to the comparator 226 is set by the slow select circuit 210. If a fuse 232 and/or a fuse 234 are blown, this failure, which would not be detected by the current limit circuits 182 and 184, will be detected by the voltage sense circuit 186 and the TRIP signal will be generated.

Referring now to the key switch circuit 188, an operator at the power node 22 may turn a key switch 236 and cause a KEY TRIP signal to be generated. This KEY TRIP signal will cause the TRIP signal to be generated.

The interface multiplexer 190 comprises an edge connector 240 for allowing communication between the board 134 and the PDU interface 172. A select line 134a is connected directly to the PDU interface 172 through the connector 240. When this line goes HIGH, analog switches 242, 244, and 246 are closed allowing the PDU interface to communicate with the switch board 134. In particular, a serial data link MOSI between the interface 172 and board 134 is established through the switch 246, while the current sense voltage may be directly detected by the interface 170 through the switch 244 and the slow threshold voltage may be directly detected by the interface 170 through the switch 242.

The serial Link switch 246 is connected to a shift register 248. The shift register 248 allows the status of a PROTECT signal, which will be explained in detail below, and the state of the key switch 236 to transferred to the PDU interface 172. The shift register 248 also allows the TRIP signal to be generated from the PDU interface 172.

In particular, to receive data from the switch card 134, select line 134a is set HIGH to close the analog switch 246 and allow information to be clocked out of the shift register 248 on a line MISO connected to the PDU interface 172. The shift register 248 is then clocked eight times to transfer out eight bits through the switch 246, with two of the eight bits indicating the status of the PROTECT signal and the key switch 236.

To send data to the switch card 134, an eight bit word is clocked into the shift register on a line MOSI directly to the serial port of the shift register 248. Then, by toggling the select line 134a, the most significant bit of that eight bit word may be clocked through a flip flop 250 to cause a REMOTE TRIP signal to be generated at the Q output of this flip flop 25. The REMOTE TRIP signal is generate whenever this most significant bit changes from low to high. The REMOTE TRIP signal also causes the TRIP signal to be generated.

A switch logic circuit 252 contains the logic necessary to convert the various outputs of the slow current limit circuit 182, fast current limit circuit 184, voltage sense circuit 186, key switch circuit 188, and interface multiplexer circuit 190 into the TRIP signal.

In particular, the switch logic circuit 252 comprises a NAND gate 254, a flip flop 256, a NAND gate 258, a NAND gate 260, and a NAND gate 262. The FAST TRIP, SLOW TRIP, and VOLTAGE TRIP signals are NANDed by the gate 254 such that the output of the flip flop is reset to generate the PROTECT signal any time a fault-indicating overcurrent condition is present.

The NAND gates 260 and 262 are configured such that the TRIP signal is generated at the output of the NAND gate 262 any time at least one of the PROTECT signal, the SWITCH TRIP signal, and the REMOTE TRIP signal is present.

The NAND gate 258 generates a RESET signal at its output any time the REMOTE TRIP or KEY TRIP signals are toggled. The RESET signal will attempt to reset the flip flop 256. Thus, if the conditions that caused the PROTECT signal to be generated are no longer present, the TRIP signal will be cleared and the switch 178 will be closed.

During operation, whenever the PROTECT signal is generated, the REMOTE TRIP signal is toggled several times in a predetermined sequence in an attempt to reset the board 134. The predetermined sequence is normally programmed into the PDU interface 172 as will be described in detail below. The predetermined sequence can be, for example, toggling the REMOTE TRIP signal once every half cycle of the power signal for several half cycles and then waiting for 5 seconds and toggling again. If this sequence does not reset the switch board 134, a fault condition probably exists in the cable load and repair may be required.

The switch board also contains a surge masking circuit 264 for preventing current surges at turn on from tripping the fast current limiting circuit 184. This circuit 264 comprises a resistor circuit 266 that can be switched into and out of line with the conductor 180 by a switch 268. Whenever the switch 178 is closed, the switch 268 is held open for a short time to allow current in the conductor 180 to flow through the resistor circuit 264, thereby limiting this current so that it does not trip the fast current limiting circuit 184. A short time later, the switch 268 is opened to allow current to bypass the resistor circuit 264.

The remaining circuitry on the board 134 not specifically discussed perform such functions as providing voltage sources for the components on the board 134, providing appropriate time delays to ensure that the components are in the proper state upon turn on, and absorbing transients on the conductor 180.

b. Power Distribution Interface

The power distribution interface and its communication with the power distribution switch boards 134–148 will now be discussed with reference to FIGS. 4 and 5.

Referring initially to FIG. 4, it can be seen that the PDU interface 174 basically comprises a zero crossing detector 270, a controller 272, and voltage detectors 274a and 274b. The voltage detectors 274a and 274b detect the voltage on the lines "A" and "B" described above. The zero crossing detector 270 generates a short pulse whenever the voltages on these lines "A" and "B" cross zero volts.

The controller 272 has eight inputs connected to eight select lines 134a–148a, including the select line 134a described above. The controller 272 is also connected to the switch boards 134–148 by five data lines in parallel. A RS485 serial port is also provided to allow communication with between the PDU interface 172 and the power supply interface 174.

Figure 5A:
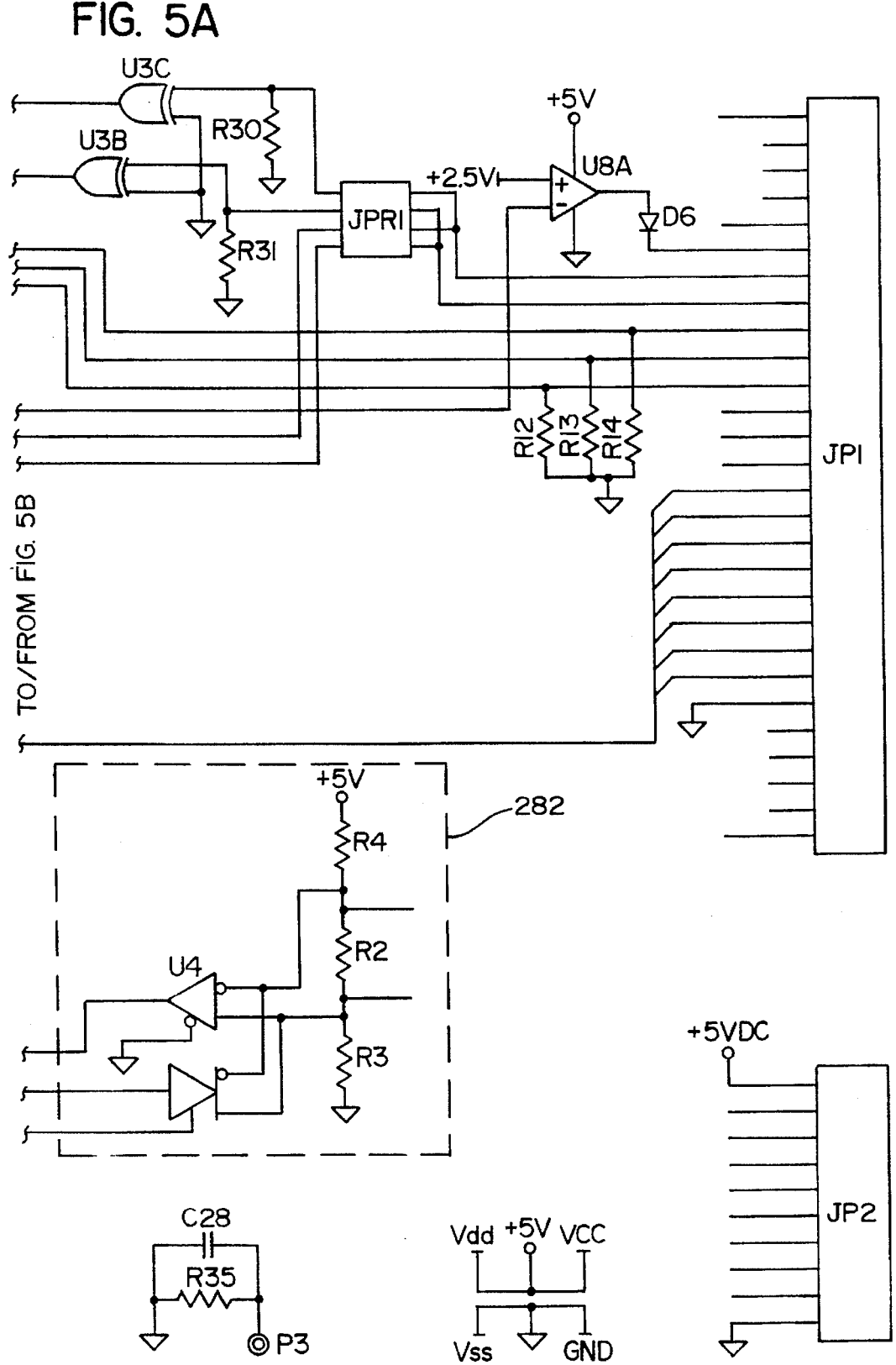
FIG. 5 is a detailed circuit diagram showing the construction of the power distribution interfaced depicted in FIG. 4.
Figure 5B:
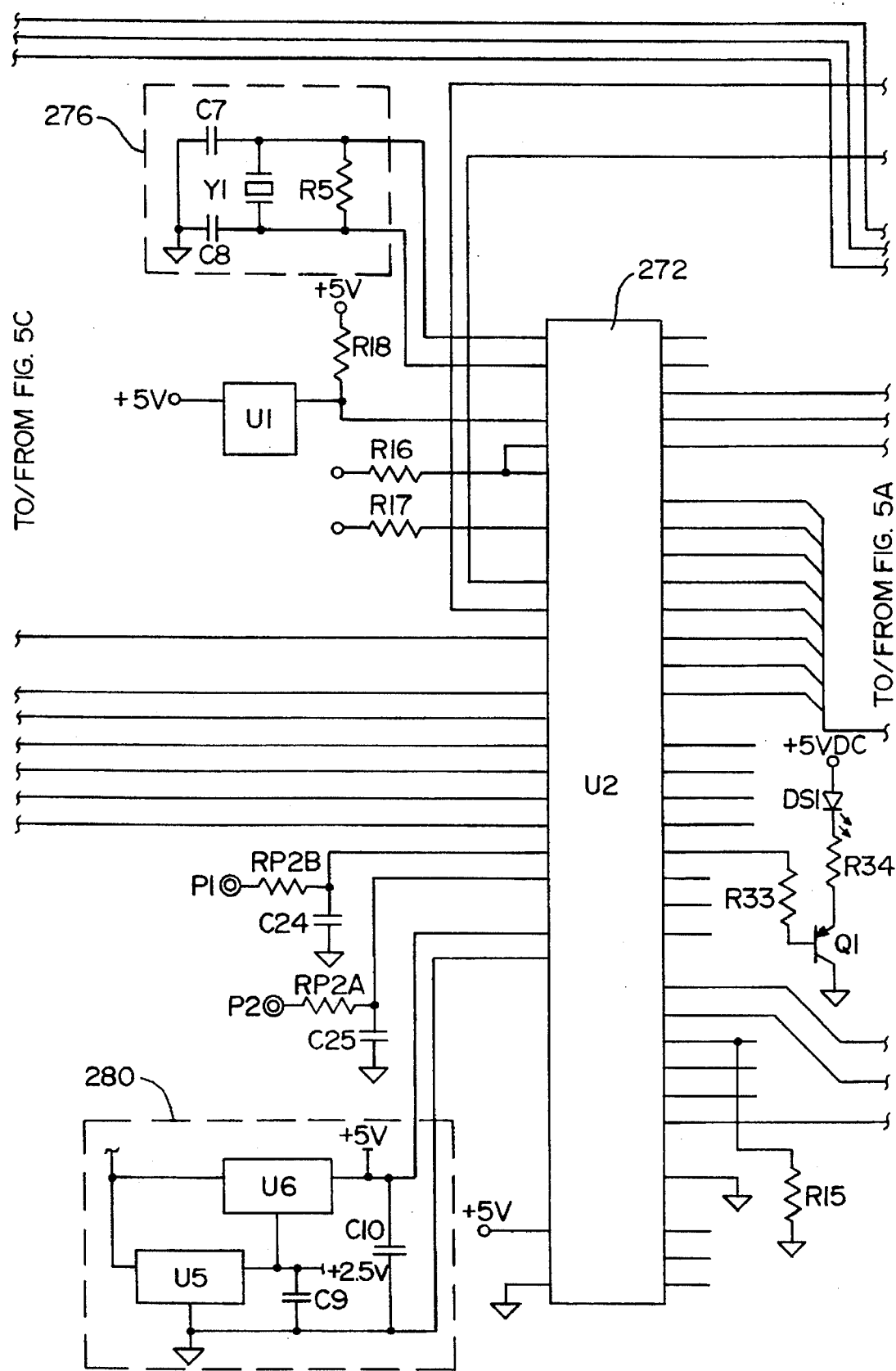
Figure 5D:
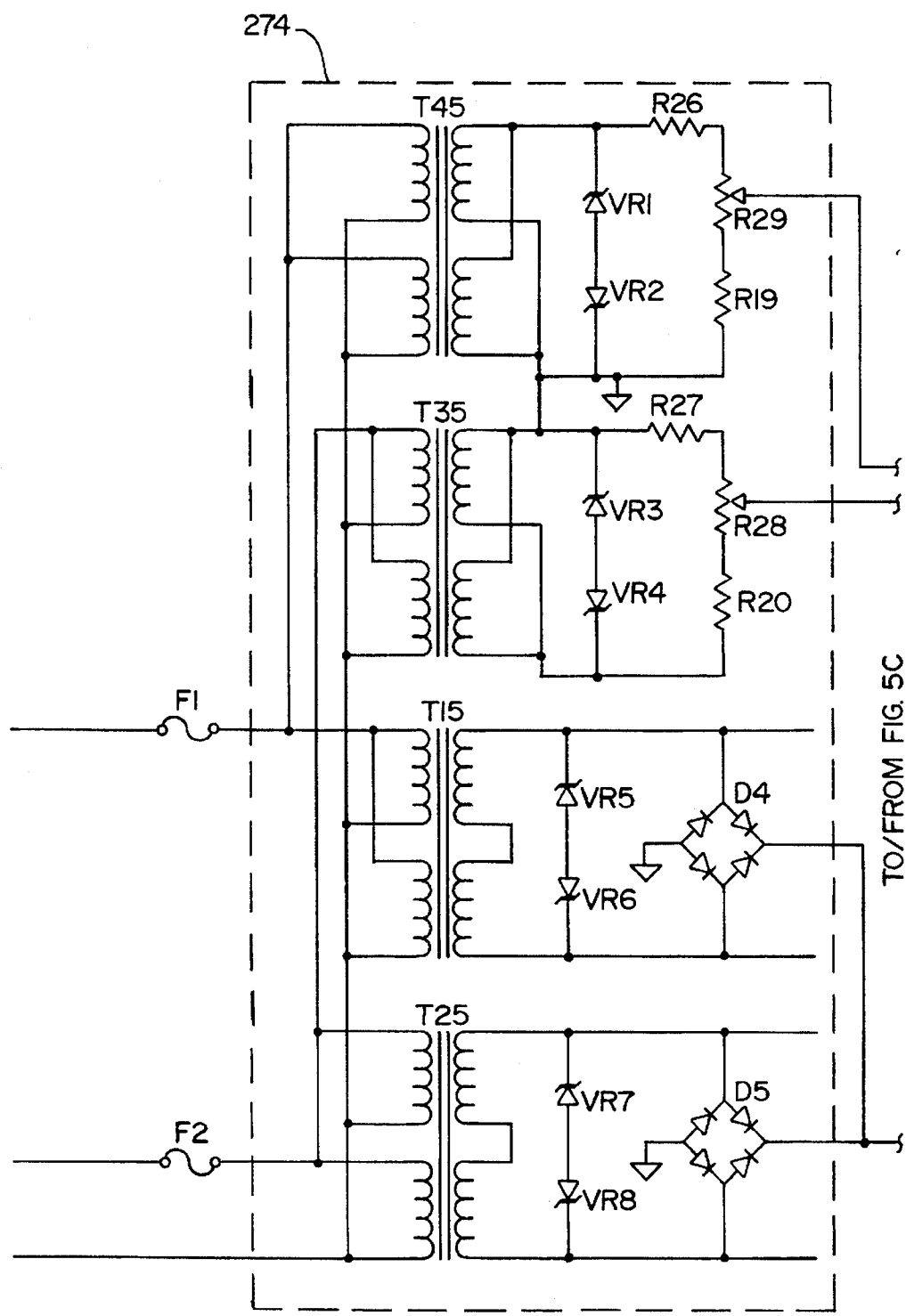

As shown in more detail in FIG. 5, the five data lines contain the MISO and MOSI serial communication lines described above, a clock line SCLK, and MOD-LIM and MOD-AMP lines for receiving the slow threshold and analog current sense voltages, respectively, from each of the boards 134–148. Analog switches such as the switches 242 and 244 located on each of the boards 134–148 allow only the board selected by one of the select lines 134a–148a to be connected to the controller 272 through the MISO, MOD-LIM, and MOD-AMP lines. Accordingly, through Eke select lines 134a–148a, the controller 272 can select any one of the switch boards 134–148 and transfer data to and from these boards.

Referring now to FIG. 5, it can be seen that the PDU interface 172 further comprises a clock circuit 276 for generating a clock signal for the controller 272. The interface 172 further comprises a filter circuit 278 for attenuating noise on the analog lines entering the controller. The interface 172 further comprises a voltage reference circuit 280 for generating reference voltages for the analog portion of the controller 272. A transceiver 282 is also provided for the RS485 serial port.

The exemplary controller 272 contains A/D converters, a general purpose microprocessor, and RAM and ROM memory for the storage of data and program instructions. Software within the controller 272 determines which of the switch boards 134–148 are selected, monitors the status of these boards, if possible resets these boards 134–148 when current limit and voltage sense circuits thereon detect a fault and generate the PROTECT signal, and periodically notifies the power supply interface module 174 of the status of each of the switch boards.

In particular, the controller 272 operates the select lines to poll each of the switch boards 134–148 every half-cycle of the power signals on line "A" and "B". The actual current and slow current threshold voltages are converted to digital values and, along with bits indicating the status of the PROTECT signals and the key switches associated with the boards, forwards these digital values to the power supply interface module 174 through the RS485 serial line for storage in the status array.

If the status of any of the PROTECT signals indicates that a fault has been detected, the controller 272 attempts to reset the switch board associated with the fault condition as generally described above.

The controller 272 also receives instructions from the power supply interface 174 and implements these instructions by operating the appropriate select line and sending the appropriate information over the MOSI line.

Controllers such as the controller 272 are well-known in the art and will not be described herein in further detail. The exemplary controller 272 is available from MOTOROLA as part number 68HC711E9FN.

c. Other Interfaces

Figure 6:
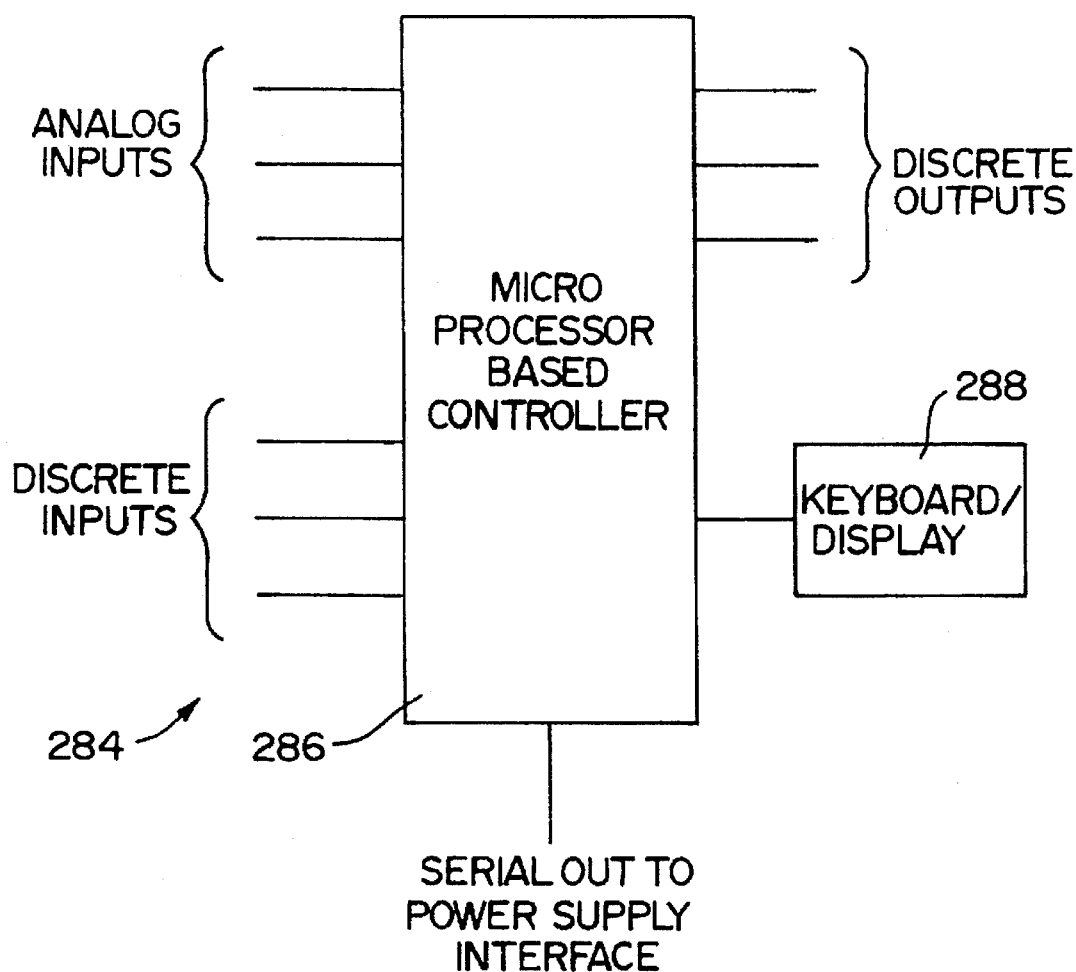
FIG. 6 is a generalized block diagram of the remaining interfaces depicted in FIG. 2.

Referring now to FIG. 6, a generic model 284 for the implementation of Eke generator, switch, UPS, bypass, and power supply interfaces will be briefly discussed.

Each of these interfaces comprises a controller 286 such as the controller 272 described above. This controller 286 has a series of analog inputs, a series of discrete inputs, a series of discrete outputs, a RS485 serial port, and support for such peripherals as a display/keyboard 288. The discrete and analog inputs allow the controller 286 to monitor sensors to determine the status of various components of power supply 22. For example, the temperature of batteries within the UPS module 128, the status of the motor within the motor/generator 122, and the status of the switches within the switch array 124 may be monitored. Where analog values are monitored, these values are converted to digital values for transmission on RS485 serial data lines.

As briefly described above, the processor within the power supply interface 174 maintains an array containing values indicating the status of the different points throughout the power supply 22 as detected by the various interfaces 164–174. Table A attached hereto contains a description of the various analog measurements made throughout the exemplary power supply 22 and the units in which these measurements are made. Table B contains a description of various discrete values detected throughout the power supply 22 and the meaning of these detected discrete values. In particular, these discrete values mean one thing when set and another thing when cleared, and Table B defines what these discrete values mean when set and cleared.

The status array maintained within the power supply interface 174 contains the contents of Tables A and B. When any of the entries in the status array change, the changed values are transferred to the control station 64 so that appropriate action may be taken.

d. UPS Module

Figure 7:
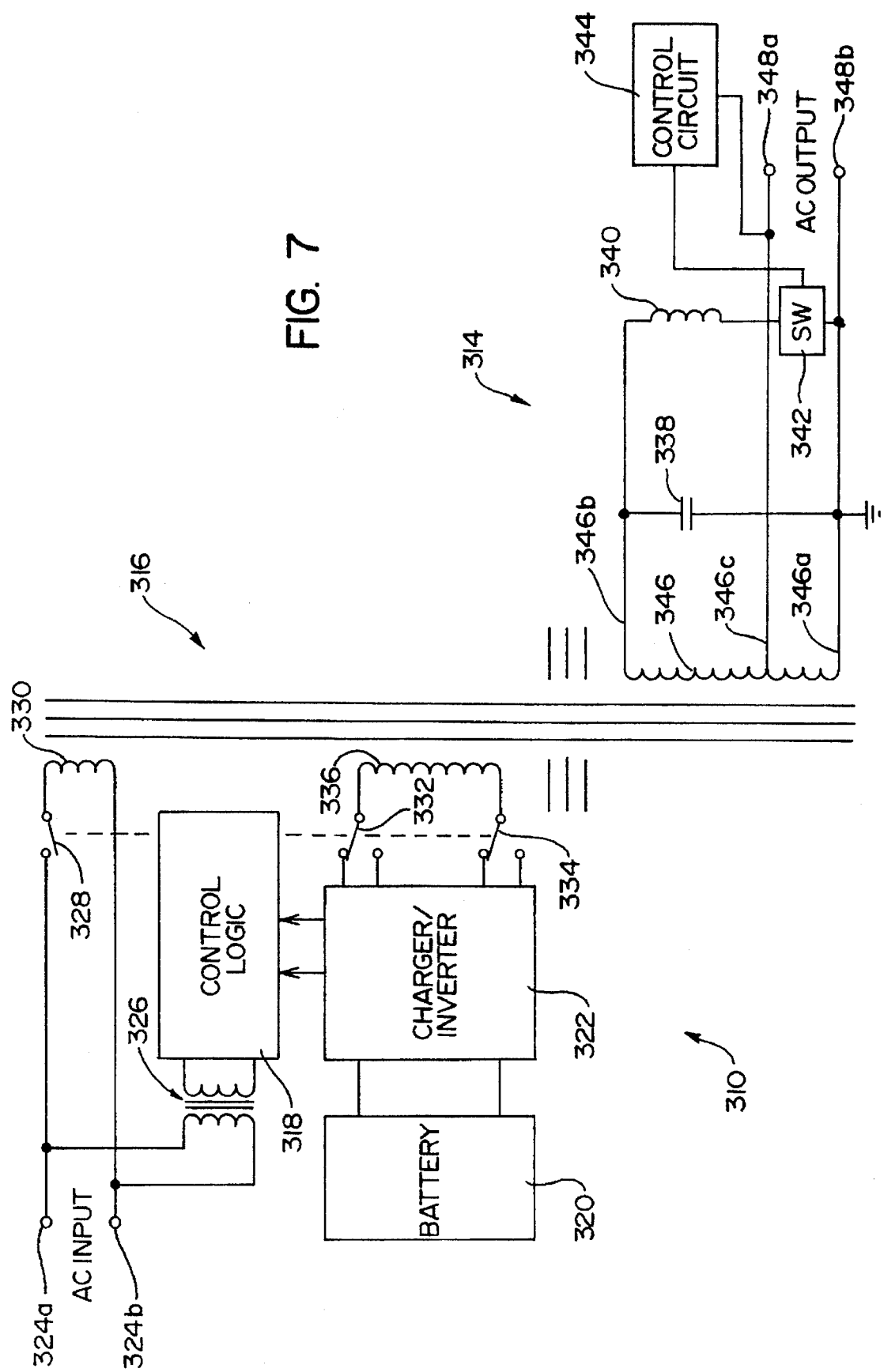
FIG. 7 is a block diagram of the UPS module shown in FIG. 2.

Referring now to FIG. 7, depicted therein is a block diagram of the UPS module 128. The UPS module 128 basically comprises an input or primary portion 312, an output or secondary portion 314, and a ferroresonant transformer 316.

The input portion 312 basically comprises a control circuit 318, a battery 320, and a charger/inverter circuit 322. AC line voltage is present at input terminals 324a,b of the UPS module 128. A control transformer 326 allows the control logic circuit 318 to monitor the AC line voltage. A line switch 328 is connected between the input terminals 324a,b and input or primary windings 330 of the ferroresonant transformer 316. Charger/inverter switches 332 and 334 are connected between the charger/inverter circuit 322 and a second set of input or primary windings 336 of the ferroresonant transformer 102 shown in FIG. 7.

This input portion 312 of the UPS module 128 operates in the same basic fashion as the input portion of the power supply 94 described above and will not be described in detail again.

The output portion 314 of the UPS module 128 basically comprises a resonant capacitor 338, an inductor 340, a switch 342, and a output control circuit 344. The resonant capacitor 338 is connected across output or secondary windings 346 of the ferroresonant transformer 316. The inductor 340 and switch 342 are connected in series with each other and in parallel with the resonant capacitor 338 across the output windings 346. A first side 346a of the output windings 346 is connected to ground.

The resonant capacitor 338 controls the frequency of the AC power signal; the value of the resonant capacitor 338 is 20 microfarads in the exemplary UPS module 128.

The output control circuit 344 controls the switch 342 based on the AC power signal across output terminals 348a and 348b. The first output terminal 348a is connected to a center tap 346c of the output windings 346, while the second output terminal 348b is connected to ground. The AC power signal will have the same shape as, but will be smaller in magnitude, than the voltage across the first and second terminals 346a and 346b.

The output circuit 314 operates basically as follows. In general, the output voltage across the output terminals 348a,b is controlled by the value of the resonant capacitor 338. However, the control circuit 244 opens and closes the switch 342 based on the level of the voltage present across the output windings 346. The opening and closing of the switch 342 controls the amount of current flowing through the inductor 340. Current flowing through the inductor 340 serves to vary the charging rate or effective capacitance of the resonant capacitor 338.

The control circuit 344 can therefore be designed to open and close the switch 342 at appropriate intervals to provide ferroresonant regulation without core saturation and in a manner that results in an AC output signal across the terminals 348a,b having the desired characteristics of a power signal as described above.

Figure 8:
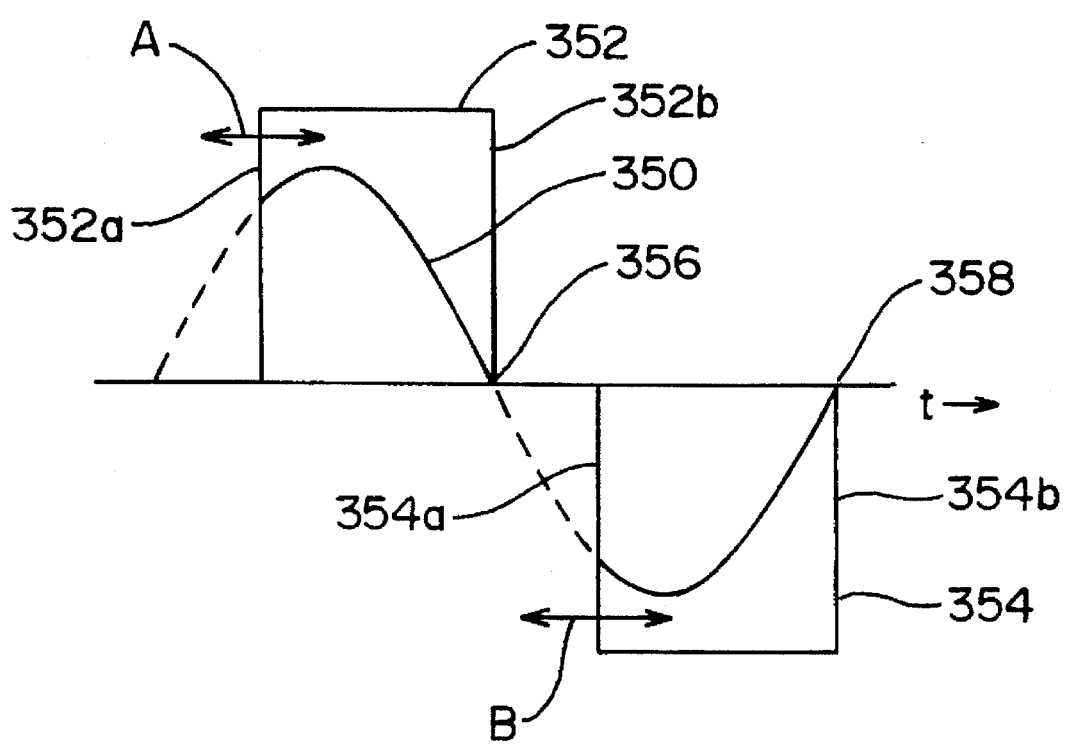
FIG. 8 depicts the signal employed to control the AC switch depicted in FIG. 7.

FIG. 8 depicts the relationship between the duty cycle of the switch 342 and the current $I_L$ flowing through the inductor 340. In particular, the current $I_L$ is shown at 350 in FIG. 8 while periods during which the switch 342 is opened and closed at relatively high frequency are depicted at 352 and 354 in that Figure. The leading edges 352a and 354a of the periods 352 and 354 are moved as shown by arrows A and B according to an error signal developed based on the voltage across the output or secondary windings 346. The trailing edges 352b and 354b of the periods 352 and 354 correspond in time to the zero crossing points 356 and 358 of the inductor current $I_L$. As will be described in further detail below, the time periods 352 and 354 depicted in FIG. 8 can be manipulated to obtain an AC power signal across the terminals 348a,b that can be held within precise waveform shape, frequency, and amplitude parameters.

Figure 9:
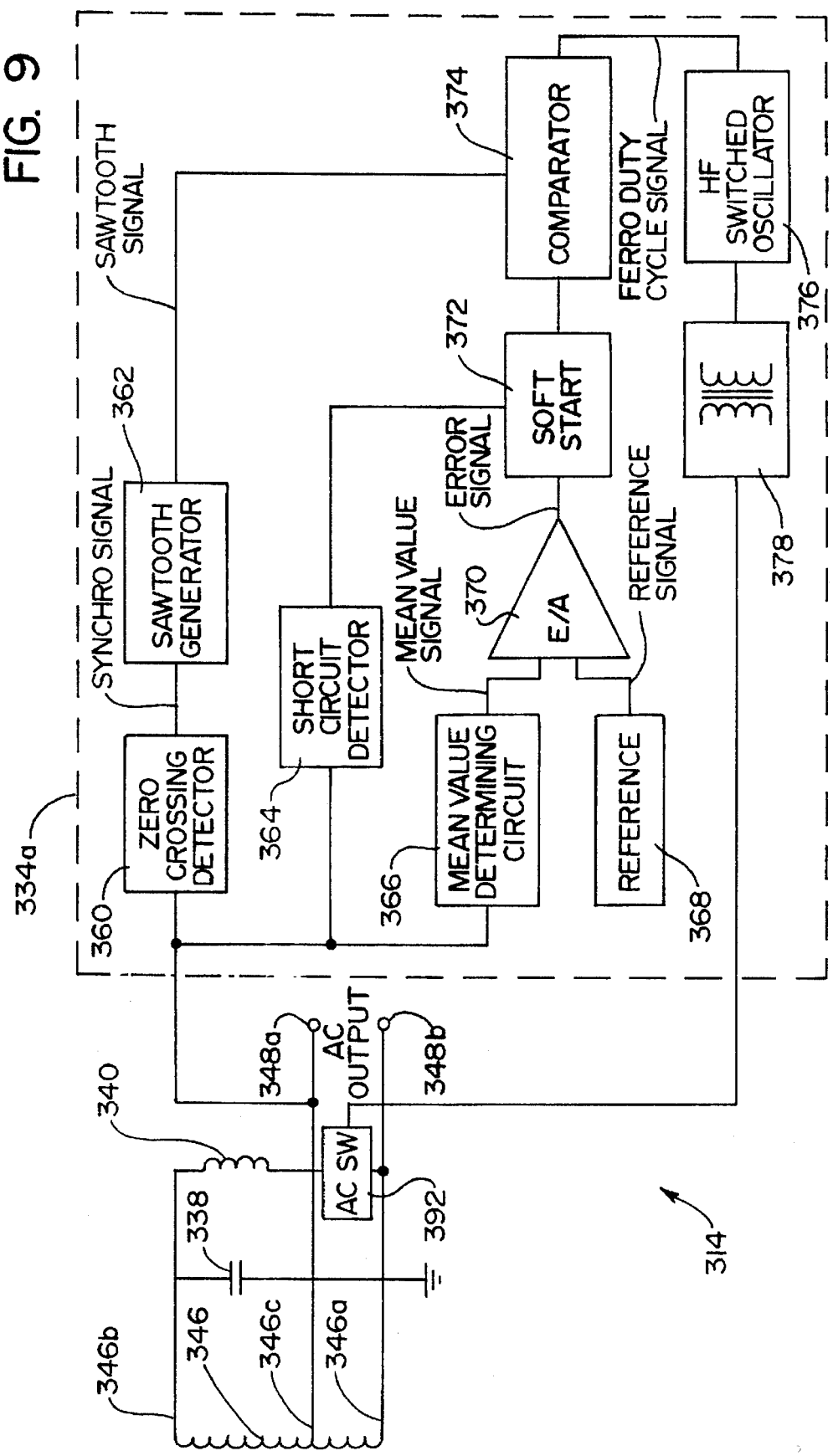
FIG. 9 depicts a block diagram of an exemplary control circuit as shown in FIG. 7.

Referring now to FIG. 9, depicted therein is a block diagram showing the details of operation of an exemplary output control circuit 334a. This control circuit 334a basically comprises a zero crossing detecting circuit 360, a sawtooth generating circuit 362, a short circuit detecting circuit 364, a mean value determining circuit 366, a reference setting circuit 368, an error amplifier 370, a soft start circuit 372, a comparator circuit 374, a high frequency switched oscillator 376, and a coupling circuit 378.

The mean value determining circuit 366 generates a DC signal representing the mean value of the AC power signal. The error amplifier 270 generates an error signal corresponding to the difference between the mean value signal generated by the circuit 266 and a reference signal generated by the reference circuit 368. In the absence of a short circuit, the error signal enters the comparator circuit 274, where it is compared with a sawtooth signal generated by the sawtooth generating circuit 362. When a short circuit occurs, the short circuit detecting circuit 364 causes the soft start circuit 372 to prevent the sawtooth signal from reaching the comparator circuit 374.

The signal generated by the sawtooth generator 362 is a sawtooth waveform that returns to zero at every pulse generated by the zero crossing detection circuit 360. The zero crossing detection circuit 360 generates a short pulse every time the voltage across the output or secondary windings 346 of the ferroresonant transformer 316 becomes zero.

The output of the comparator circuit 374 is a pulse train, where the trailing edge of each pulse occurs when the voltage across the output windings 346 crosses zero volts and the width of each pulse corresponds to the error signal: generally, as the error signal decreases, the pulse width increases; and, as the error signal increases, the pulse width decreases. The output of the comparator circuit 374 will be referred to herein as the ferro duty cycle signal. This is because, as will be discussed in further detail below, the widths of the pulses generated by the comparator circuit 374 generally correspond to the time periods during which the switch 342 is closed, such as the periods depicted at 352 and 354 in FIG. 8, which controls the amount of current flowing through the resonant capacitor 338.

The high frequency switched oscillator 376 generates a relatively high frequency signal whenever the output of the comparator circuit 374 is high. The pulsed high frequency signal generated by the oscillator 376 is passed through the coupling circuit 378 to the AC switch 342. The AC switch 142 is thus closed at during the time periods when the output of the comparator circuit 374 is high.

The AC output signal generated by the UPS module 128 employing the control circuit 334a is, in this manner, controlled to be the same as that depicted at 270 in FIG. 270.

Referring now to FIG. 10A–C and 18, shown therein are the details of construction and operation of the exemplary control circuit 334a.

Figure 10:
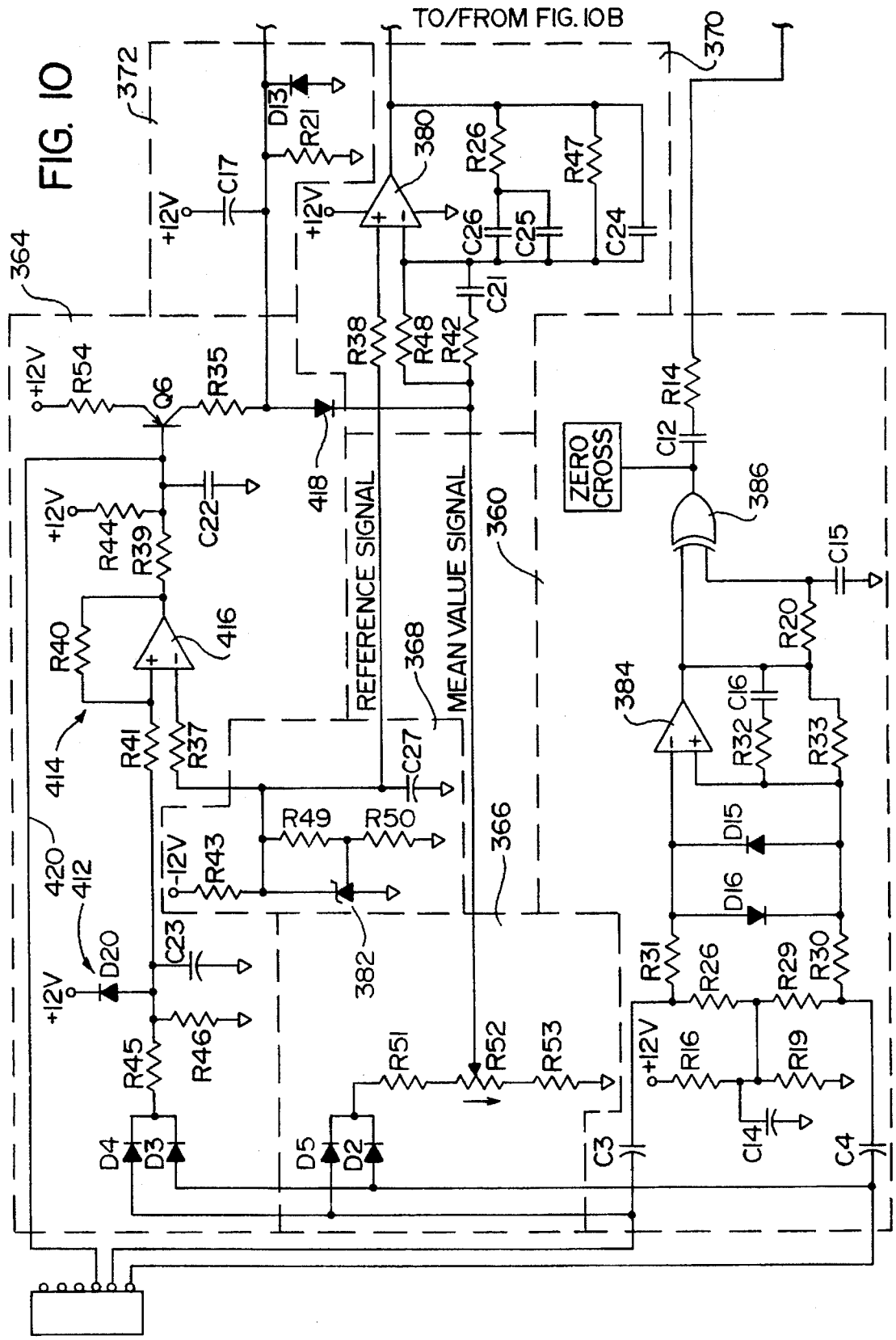
FIGS. 10A–C is a detailed schematic showing details of the control circuit of FIG. 9.
Figure 10B:
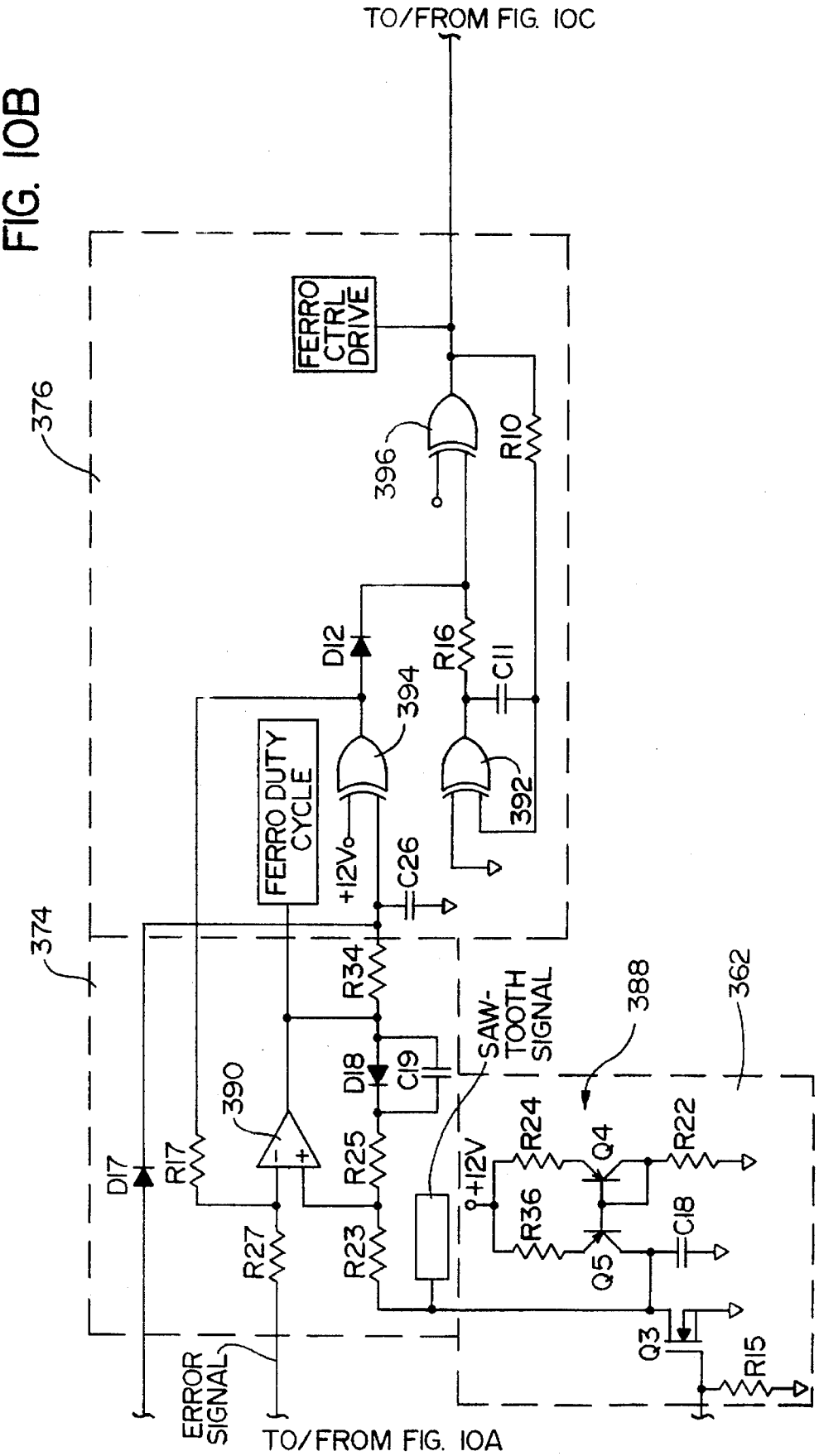
Figure 10C:
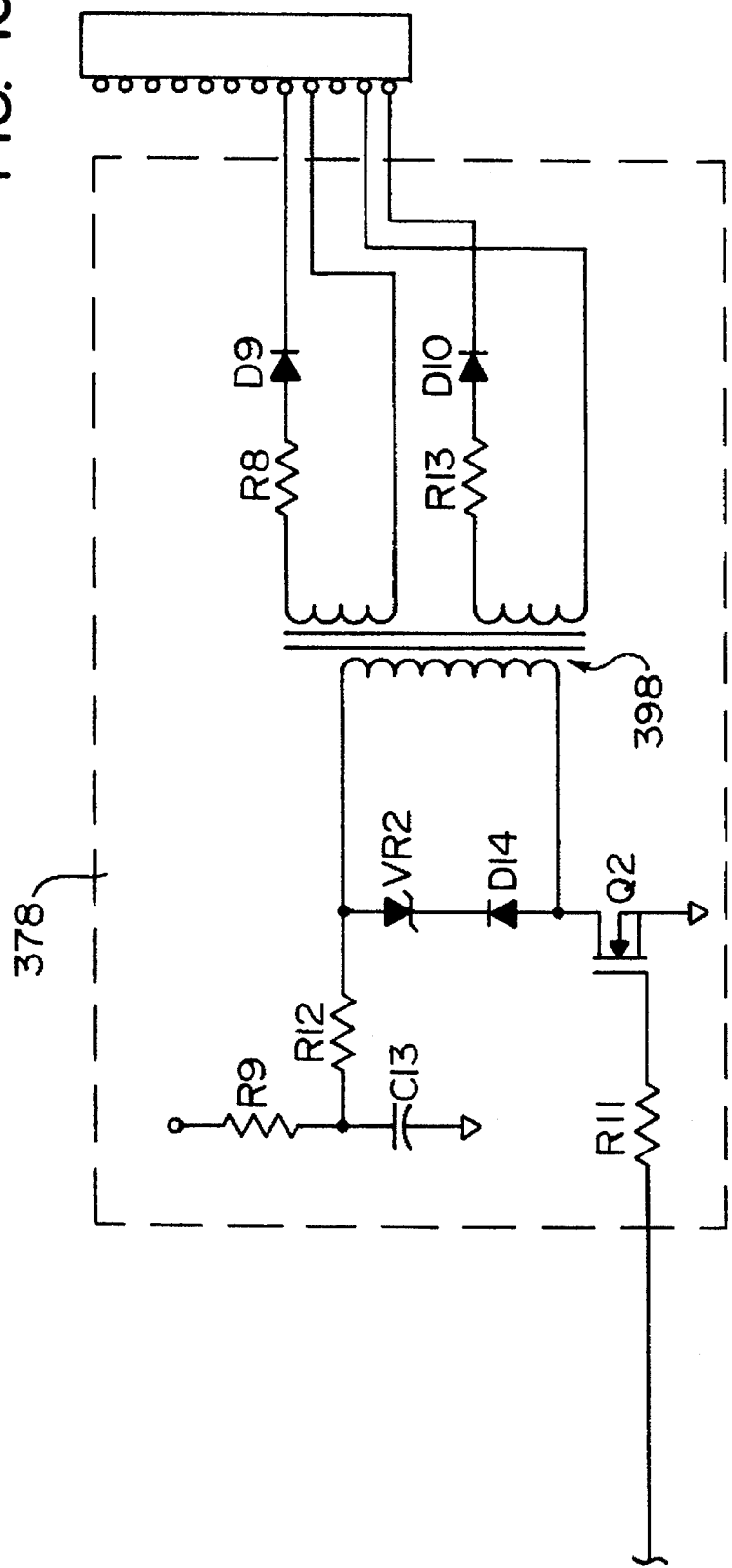

Turning initially to FIG. 10A, the error amplifier 370 is shown to comprise a differential amplifier 380 and its associated components. The components associated with the amplifier 380 are arranged in a known manner such that the amplifier 380 acts as a feedback integrator. In particular, R38 is a current limiting resistor for providing input protection, while resistors R48, R42, R26, R47 and capacitors C21, C24, C25, C26 provide loop compensation for the feedback integrator formed by the amplifier 380.

Accordingly, the inputs to the error amplifier 370 are the reference and mean value signals identified in FIG. 10A. The reference circuit 368 that generates the reference signal comprises an adjustable Zener diode 382, resisters R43, R49, and R50, and a capacitor C27. The level of the reference signal is see by the diode 382 and the values of the resisters R43, R49, and R50; capacitor C27 filters off any high frequency components of the reference signal.

The mean value determining circuit 366 generates a DC signal (the mean value signal) the amplitude of which corresponds to the mean value of the AC power signal. In particular, the diodes D2 and D5 generate a DC signal corresponding to the AC power signal, while resistors R51, R52, and R53 are scaling resistors that scale the DC signal so generated to the correct level.

The zero crossing detector circuit 360 is depicted at the bottom of FIG. 10A. The zero crossing detector circuit 360 has as its input the AC power signal and generates a short pulse each time the AC power signal crosses zero. In the zero crossing detector circuit 360, resistors R16, R19, R26, R29, R31, and R30 set the center of the sine wave input to the circuit 360. Diodes D16 and D15 clamp the sine wave. An operational amplifier 384 with associated resistors R32 and R33 and capacitor C16 form a Schmitt trigger that has as its output a square wave that is in phase with and has the same frequency as the sine wave input to the circuit 360. An XOR gate 386 generates a pulse train based on the square wave at the output of the amplifier 384, with the width of the pulses being determined by the values of resistor R20 and capacitor C15. Capacitor C12 further narrows the pulses generated at the output of the XOR gate 386. The value of the resistor R14 sets the width of the pulses so generated.

The sawtooth generator 362 (FIG. 17B) generates a sawtooth waveform based on the pulses generated by the zero crossing detector 360. In particular, the sawtooth generator 362 comprises: (a) a current source 388 formed by transistors Q5 and Q4, resistors R36, R24, and R22; (b) a capacitor C18, and (c) a switch amplifier Q3 having a resistor R15 associated therewith. The current source 388 charges the capacitor C18. The pulses generated by the zero crossing detector 360 close the switch Q3 to discharge the capacitor C18. The output of the sawtooth generator 362 is a sawtooth waveform that returns to zero every time the voltage across the transformer output windings 346 crosses zero.

The error signal generated by the error amplifier 370 and the sawtooth waveform generated by the sawtooth generator 362 are compared by the comparator circuit 374. The comparator circuit 274 comprises a differential amplifier 290 and the following components associated therewith: resistors R27, R17, R23, R25, and R34; capacitor C19; and a diode D18.

The ferro duty cycle signal generated by the comparator circuit 374 as shonw in FIG. 18A is HIGH whenever the signal at its inverting input is lower than the signal at its non-inverting input and is LOW whenever the signal at its inverting input is higher than the signal at its non-inverting input.

The ferro duty cycle signal is sent to the high frequency switched oscillator circuit 376 where it modulates a high frequency carrier signal. In particular, the oscillator circuit 376 comprises first and second XOR gates 392 and 394 configured with resistors R16 and R10 and capacitor C11 to generate the high frequency carrier signal. A third XOR gate 396 and a diode D12 are connected to inhibit the high frequency carrier signal when the output of the comparator circuit 374 is low. As a result, a ferro drive control signal generated at the output of the oscillator circuit 376 comprises bursts of high frequency pulses, with the duration of each burst of pulses being related to the magnitude of the error signal.

The ferro drive control signal then connects through a resistor R11 and a switching transistor Q2 to a coupling transformer 398. The resistor R11 is a smoothing/switching resistor. A resistor R12 provides protection. A capacitor C13 filters out any AC components of the voltage Vbulk. A diode VR2 resets the magnetic core. A diode D14 prevents short circuiting of the coupling transformer 298. Diodes D9 and D10 rectify the output of the coupling transformer 398 to obtain signals appropriate for controlling the AC switch 342. Resistors R8 and R13 are current limiting resistors.

Referring for a moment to FIGS. 21A–C, depicted therein is a timing diagram showing the relationship of certain of the signals within the output control circuit 334a at two different points in time. In FIG. 18A, the error signal generated by the error amplifier 380 at a first point in time is depicted at 404a and the sawtooth signal generated by the sawtooth generator 362 and zero crossing detector 360 is depicted at 406. The ferro duty cycle signal is depicted at 408 in FIG. 18B. Depicted at 410 in FIG. 18C is the ferro drive control signal. In FIG. 18A, the error signal generated by the error amplifier 380 at a second point in time is depicted at 404b and the sawtooth signal generated by the sawtooth generator 362 and zero crossing detector 360 is again depicted at 406.

The ferro duty cycle signal is depicted at 408 in FIG. 18B. Depicted at 410 in FIG. 18C is the ferro drive control signal.

Figure 11A:
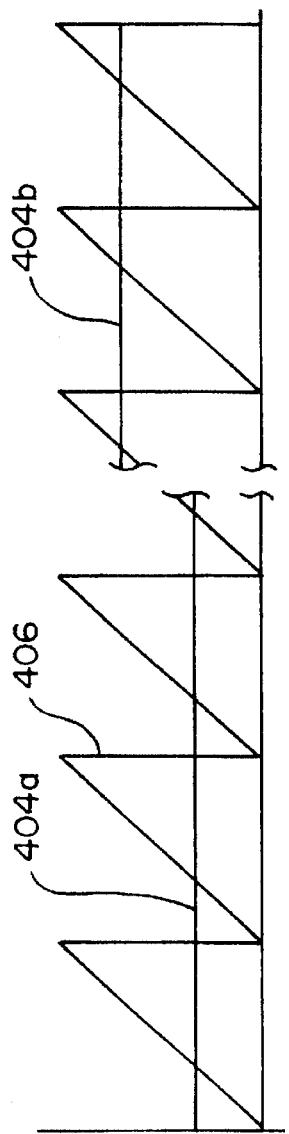
FIGS. 11A–B are timing diagrams depicting certain of the signals present in the circuit depicted in FIG. 10A–C.
Figure 11B:
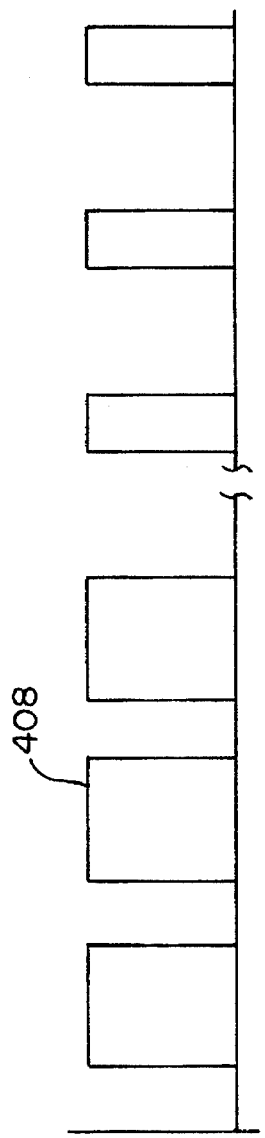
Figure 11C:
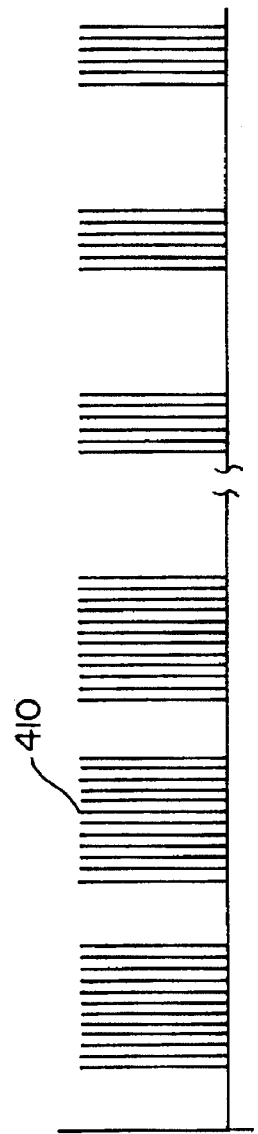

By comparing the signals depicted in FIGS. 11A–C, it can be seen that the width of the ferro duty cycle signal 408 decreases as the error signal 404 increases. The widths of the pulse bursts in the ferro drive control signal 410, which correspond to the widths of the pulses in the ferro duty cycle signal 408, also decreases with an increasing error signal.

Thus, as the error signal 404 varies with the deviation of the AC power signal from a predetermined voltage, the ferro drive control signal 410 varies to control the output winding voltage as necessary to keep the mean value of the AC power signal near a predetermined level.

Further, the exact level of the error signal 402 is a function of the reference signal 404; accordingly, by decreasing a sampled scaled ouput voltage with the variable resistor R52, the mean value of the voltage across the transformer output coils 346 can be varied as necessary to obtain the desired AC power signal.

Referring for a moment back to FIG. 10A, the short circuit detecting circuit 364 and soft start circuit 372 will be discussed in further detail. Resistors R45 and R46, capacitor C23, and diodes D3 and D4 form a output voltage mean value circuit 412 that generates a DC signal corresponding to the mean value of the voltage across the transformer output coils 346. A comparator circuit 414 formed by a differential amplifier 416, resistors R41, R37, R40, R39, R44, and capacitor C22 compares the mean value signal generated by the mean value circuit 412 with a reference signal generated by the reference signal generating circuit 368 discussed above. Transistor Q6, resistors R54 and R35, and diode 418 form a circuit that brings to 12 V the node between the resistor R35 and the diode 418 when the transistor Q6 is turned off.

The soft start circuit 372 comprises a capacitor C17, resistor R21, and diode D13. When the transistor Q6 of the short circuit detecting circuit 364 is turned on, the capacitor C17 is discharged, which brings the ferro duty cycle signal to 100% and thereby pulls the AC power signal to a low level.

The transistor Q6 is turned on when the mean value of the voltage across the transformer output windings 346 drops below a predetermined level, indicating a short circuit. In particular, when the output voltage mean value signal drops below the reference signal, the output of the comparator goes LOW. This LOW signal is ORed with another signal generated by a current transformer in the input side 312 through a conductor 420 to ensure system start-up stability under other conditions. This HIGH signal also turns on the transistor Q6.

When the short circuit condition is removed, the capacitor C17 must charge before the ferro duty cycle signal can be brought down from 100% duty cycle. Accordingly, the capacitor C17 delays resumed operation of the control circuit 334a to allow the system to stablize.

The advantage of using a controlled ferroresonant transformer as described above is that the power signal can be tightly regulated in both amplitude and frequency. This is important because the frequency of the AC output of motor driven electrical generators is very unstable. Frequency variations on the primary side of the controlled ferroresonant transformer do not affect the power signal generated on the secondary side thereof.

e. Bypass Module

Referring now to FIG. 19, depicted therein is a block diagram of the bypass module 126. The bypass module 126 is operates in a manner similar to that of the UPS module 128 but, because it is not uninterruptible, an input portion 420 thereof does not contain an inverter/charger or the battery and control logic associated therewith.

The bypass module 126 comprises a ferroresonant transformer 422 having primary windings 424 and output windings 426. An output portion 428 of the bypass module 126 comprises a resonant capacitor 430, an inductor 432, a switch 434, and a output control circuit 436. The resonant capacitor 430 is connected across output or secondary windings 426 of the ferroresonant transformer 422. The inductor 432 and switch 434 are connected in series with each other and in parallel with the resonant capacitor 430 across the output windings 426. A first side 422a of the output windings 346 is connected to ground.

The resonant capacitor 430 controls the frequency of the AC power signal. The output control circuit 436 controls the switch 434 based on the AC power signal across output terminals 438 and 440. The first output terminal 438 is connected to a center tap 426b of the output windings 426, while the second output terminal 440 is connected to ground.

The output control circuit 436 operates in the same manner as the control circuit 344 described above. The explanation of the control circuit 344 applies to the circuit 436, and that explanation will not be repeated herein.

III. Other Environments

The power supply 22 described above can, with only minor modifications, be used in other environments. For example, the power supply 22 could be employed to provide power to a node in a cellular telephone network. In that case, the electronics to which power are to be provided will operate most efficiently if the power signal generated by the power supply is a sinusoidal AC signal.

Referring now to FIG. 12, depicted therein is a UPS module 128a modified to generate a sinusoidal power signal. This UPS module 128a contains the same exact components as those employed by the UPS module 128 described above; components common between the modules 128 and 128a are identified by the same reference characters and will not be discussed again.

However, the UPS module 128a further comprises first and second harmonic traps 520 and 522. The first trap 520 comprises an inductor 524 and a capacitor 526 connected in series across the output windings 346 of the transformer 316. The second trap 522 comprises an inductor 528 and a capacitor 530 also connected in series across the output windings 346 of the transformer 316. The first trap 520 is designed to trap the third harmonic of the AC signal across the output windings 346, while the second trap 522 is designed to trap the fifth harmonic of that AC signal. These traps 520 and 522 round off the leading and trailing edges of the signal across the output windings 346 to obtain a power signal that is very close to sinusoidal.

Figure 13:
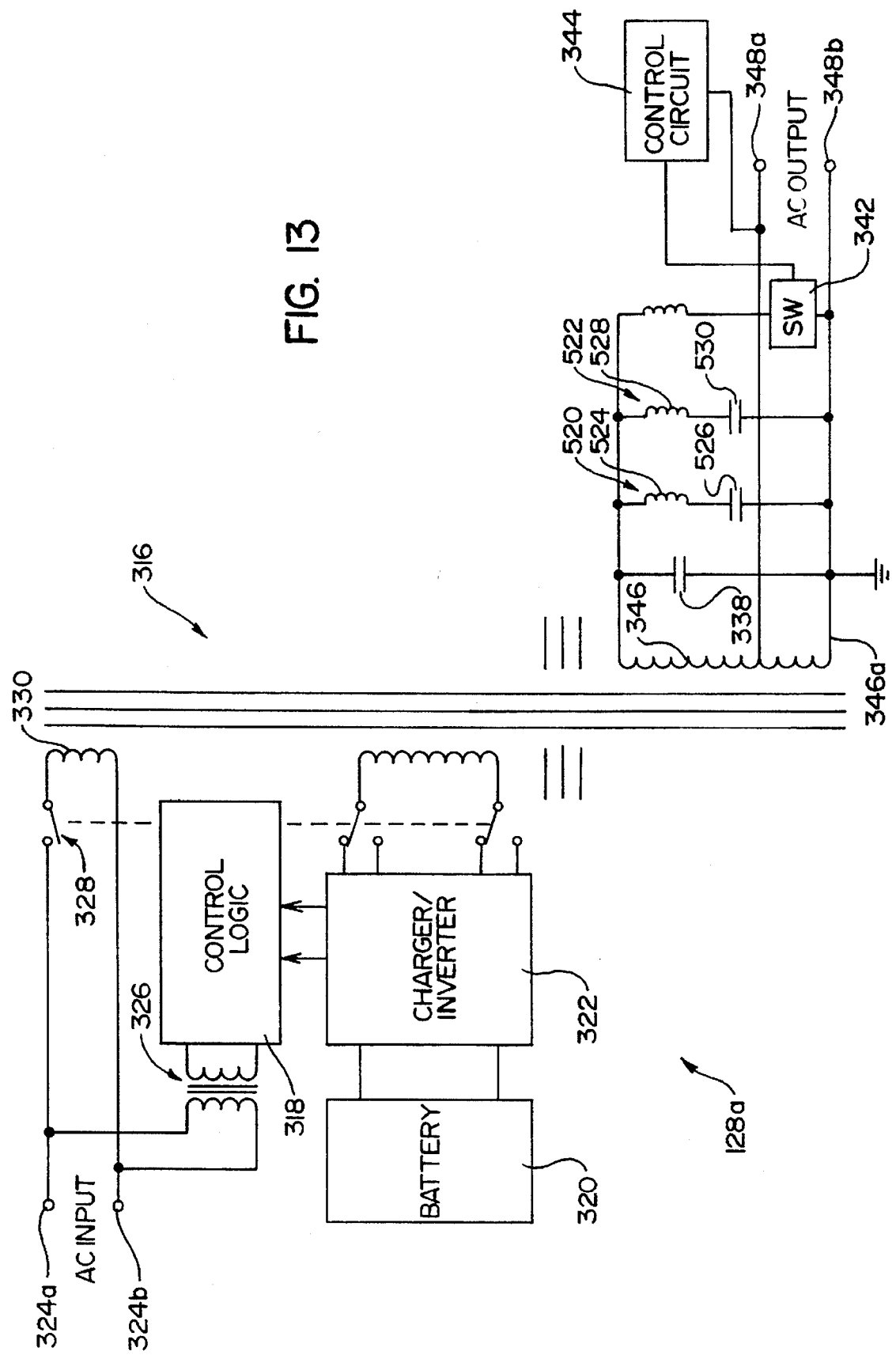
FIG. 13 is a simplified block diagram of a UPS module modified to generate generally sinusoidal power signals.

Referring now to FIG. 13, depicted therein is a bypass module 126a modified to generate a sinusoidal power signal. This bypass module 126a contains the same exact components as those employed by the bypass module 126 described above; components common between the modules 126 and 126a are identified by the same reference characters and will not be discussed again.

As with the UPS module 128a, the standby module 126a further comprises first and second harmonic traps 620 and 622. The first trap 620 comprises an inductor 624 and a capacitor 626 connected in series across the output windings 346 of the transformer 316. The second trap 622 comprises an inductor 628 and a capacitor 630 also connected in series across the output windings 346 of the transformer 316. The first trap 620 is designed to trap the third harmonic of the AC signal across the output windings 346, while the second trap 622 is designed to trap the fifth harmonic of that AC signal. These traps 620 and 622 round off the leading and trailing edges of the signal across the output windings 346 to obtain a power signal that is very close to sinusoidal.

The modified UPS module 128a and bypass module 126a thus allow the power supply 22 to be employed in a setting where the power signals generated thereby are sinusoidal.

The invention disclosed and claimed herein may be embodied in specific forms other than described above without departing from the spirit or essential characteristics thereof. The discussion presented above is therefore to be considered in all respects as illustrative and not restrictive. The scope of the invention is indicated by the appended claims rather than the foregoing description. All changes which come within the meaning and range of equivalency of the claims are intended to be embraced therein.

TABLE A

| DESCRIPTION | UNT |
|---|---|
| AC Input Voltage | Vrms |
| AC Input Current | Irms |
| AC Input Power Factor | N/A |
| AC Input | VA |
| AC Output Voltage | Vrms |
| AC Output Current | Irms |
| AC Output Power Factor | N/A |
| AC Output | VA |
| AC Output Frequency | Hz |
| UPS Battery Voltage | VDC |
| Ignition Battery Voltage | VDC |
| Channel #1 Output Current | Irms |
| Channel #2 Output Current | Irms |
| Channel #3 Output Current | Irms |
| Channel #4 Output Current | Irms |
| Channel #5 Output Current | Irms |
| Channel #6 Output Current | Irms |

TABLE A-continued

| DESCRIPTION | UNT |
|---|---|
| Channel #7 Output Current | Irms |
| Channel #8 Output Current | Irms |
| Thermal Enclosure Temp. | °F. |
| Main Enclosure Temp. | °F. |
| Battery Enclosure Temp. | °F. |
| Ambient Temp. | °F. |
| Battery #1 Voltage | VDC |
| Battery #2 Voltage | VDC |
| Battery #3 Voltage | VDC |
| Battery #4 Voltage | VDC |
| DC Bus Voltage | VDC |
| DC Bus Load Current | IDC |
| Battery Charging Current | IDC |
| Rectifier #1 Output Current | IDC |
| Rectifier #2 Output Current | IDC |

TABLE B

| DESCRIPTION | SET | CLEARED |
|---|---|---|
| UPS Line Status | Standby Mode | Line Mode |
| UPS Battery Status | Battery Low | Battery OK |
| Initiate UPS Test Cycle | Start Test | No Operation |
| RCU #1 Red Alert | RCU Failure | RCU OK |
| RCU #1 Source | Utility | Generator |
| RCU #2 Red Alert | RCU Failure | RCU OK |
| RCU #2 Source | UPS | BPS |
| BPS Red Alert | BPS Failure | BPS OK |
| BPS Source | Utility | Generator |
| Carbon Monoxide | Alarm | OK |
| Gas Leak | Alarm | OK |
| Water Intrusion | Alarm | OK |
| Pad Shear | Alarm | OK |
| Low Engine Oil Level | Alarm | OK |
| High Engine Temperature | Alarm | OK |
| Channel #1 Status | Channel ON | Channel OFF |
| Channel #2 Status | Channel ON | Channel OFF |
| Channel #3 Status | Channel ON | Channel OFF |
| Channel #4 Status | Channel ON | Channel OFF |
| Channel #5 Status | Channel ON | Channel OFF |
| Channel #6 Status | Channel ON | Channel OFF |
| Channel #7 Status | Channel ON | Channel OFF |
| Channel #8 Status | Channel ON | Channel OFF |
| Channel #1 Control | Turn Channel ON | Turn Channel OFF |
| Channel #1 Control | Turn Channel ON | Turn Channel OFF |
| Channel #1 Control | Turn Channel ON | Turn Channel OFF |
| Channel #1 Control | Turn Channel ON | Turn Channel OFF |
| Channel #1 Control | Turn Channel ON | Turn Channel OFF |
| Channel #1 Control | Turn Channel ON | Turn Channel OFF |
| Channel #1 Control | Turn Channel ON | Turn Channel OFF |
| Channel #1 Control | Turn Channel ON | Turn Channel OFF |

I claim:

1. A method of supplying an AC power signal to a plurality of discrete portions of a communications network, the method comprising the steps of:

providing a source of the AC power signal;

providing a plurality of switches;

connecting each of the switches between the source of the AC power signal and one of the plurality of discrete portions of the communications network;

operating the switches to allow current to flow from the source of the AC power signal to the portion of the communications network connected thereto;

when a trip signal associated with any given switch is generated, operating the given switch to prevent current from flowing from the source of the AC power signal to the portion of the communications network connected to the given switch, determining a status of a current component of each of the AC power signals passed through the switches;

generating the trip signal for any given switch if the current component of the AC power signal passed by the given switch exceeds a first predetermined current value for a first predetermined time value;

generating the trip signal for any given switch when a current component of the AC power signal passed by the given switch exceeds a second predetermined current value for a second predetermined time value, where the first predetermined current value is greater than the second predetermined current value and the second predetermined time value is greater than the first predetermined time value;

determining a status of a voltage component of each of the AC power signals passed through the switches; and generating the trip signal for any given switch if the voltage component of the AC power signal passed by the given switch satisfies a set of voltage criteria.

2. A power node for a communications network having a source of communication signals and a distribution network, the power node comprising:

signal multiplexing means for generating a plurality of communications signals from the source of communications signals;

a plurality of power inserters each connected to the signal multiplexing means to receive one of the plurality of communications signals; and a power supply comprising
power signal generating means for generating an AC power signal, and
a plurality of power distribution means, where each of the power distribution means connects the power supply generating means to one of the plurality of power inserters such that the AC power signal is available to the power inserters connected thereto; wherein the power inserters each generate a combined signal comprising one of the communications signals and the AC power signal; and the power distribution means makes the AC power signal unavailable to the power inserter connected thereto based on a condition of the AC power signal passing therethrough.

3. A power node as recited in claim 2, in which each of the power distribution switch means comprises a first current limit means, a second current limit means, and a switch means, where, for any given power distribution switch means and a given AC power signal made available thereby:

the first current limit means monitors the given AC power signal and generates a trip signal when the given AC power signal meets a first set of criteria;

the second current limit means monitors the given AC power signal and generates the trip signal when the given AC power signal meets a second set of criteria; and the switch means for disconnects the power signal generating means from the power inserter connected to the given power distribution switch means when the trip signal is generated.

4. A power node as recited in claim 3, in which the first set of criteria represents a first over-current condition and the second set of criteria represents a second over-current condition.

5. A power node as recited in claim 4, in which the first over-current condition occurs when a current component of the AC power signal exceeds a first predetermined current value and the second over-current condition occurs when the current component of the AC power signal exceeds a second predetermined current value.

6. A power node as recited in claim 5, in which the second current limit means comprises a second select means for adjusting the second predetermined current value.

7. A power node as recited in claim 5, in which each of the power distribution means further comprises a voltage limit means for generating the trip signal when the given AC power signal meets a third set of criteria.

8. A power node as recited in claim 5, in which the first predetermined current value is greater than the second predetermined current value.

9. A power node as recited in claim 5, in which the first over-current condition occurs when the current component of the AC power signal exceeds the first predetermined current value for a first predetermined time value and the second over-current condition occurs when the current component of the AC power signal exceeds the second predetermined current value for a second predetermined time value.

10. A power node as recited in claim 9, in which the first predetermined current value is greater than the second predetermined current value.

11. A power node as recited in claim 10, in which the second predetermined time value is greater than the first predetermined time value.

12. A power node as recited in claim 11, in which the first current limit means comprises a first select means for adjusting the first predetermined current value.

13. A power node for a communications network having a source of communication signals and a distribution network, the power node comprising:

signal multiplexing means for generating a plurality of communications signals from the source of communications signals;

a plurality of power inserters, where each power inserter receives a given one of the plurality of communications signals and delivers to the distribution network a combined signal comprising a power portion and a data portion comprising the given communications signal;

power signal generating means for generating an AC power signal; and a plurality of power distribution circuits, where each power distribution circuit comprises
switch means for passing the AC power signal to a given one of the plurality of power inserters when a trip signal is not present and for disconnecting the power signal generating means from the given power inserter when the trip signal is present,
first current limit means for monitoring the AC power signal passed by the switch means and generating the trip signal when the AC power signal passed by the switch means satisfies a first set of criteria, and
second current limit means for monitoring the AC power signal passed by the switch means and generating the trip signal when the AC power signal passed by the switch means satisfies a second set of criteria.

14. A power node as recited in claim 13, in which the first set of criteria represents a first over-current condition and the second set of criteria represents a second over-current condition.

15. A power node as recited in claim 14, in which the first over-current condition occurs when a current component of the AC power signal exceeds a first predetermined current value and the second over-current condition occurs when the current component of the AC power signal exceeds a second predetermined current value.

16. A power node as recited in claim 15, in which:

the first current limit means comprises a first select means for adjusting the first predetermined current value; and the second current limit means comprises a second select means for adjusting the second predetermined current value.

17. A power node as recited in claim 15, in which the first over-current condition occurs when the current component of the AC power signal exceeds the first predetermined current value for a first predetermined time value and the second over-current condition occurs when the current component of the AC power signal exceeds the second predetermined current value for a second predetermined time value.

18. A power node as recited in claim 17, in which each of the power distribution means further comprises a voltage limit means for generating the trip signal when the given AC power signal exceeds a first predetermined voltage value.

19. A power node as recited in claim 17, in which the first predetermined current value is greater than the second predetermined current value and the second predetermined time value is greater than the first predetermined time value.

20. A method of providing electrical power to a plurality of discrete portions of a coaxial cable communications network, the method comprising the steps of:

providing a single source of an AC power signal;

providing a plurality of switches;

connecting each of the switches between the single source of the AC power signal and one of the plurality of discrete portions of the communications network;

operating the switches to allow current to flow from the single source of the AC power signal to the portion of the communications network connected thereto;

generating a trip signal for each switch indicative of a fault condition associated therewith; and operating any given switch to prevent current from flowing from the single source of the AC power signal to the portion of the communications network connected to the given switch when the trip signal associated with the given switch is generated.

21. A power node as recited in claim 20, further comprising the steps of:

determining a status of a voltage component of each of the AC power signals passed through the switches;

generating the trip signal for any given switch if the voltage component of the AC power signal passed by the given switch satisfies a set of voltage criteria.

22. A method as recited in claim 20, further comprising the steps of:

determining a status of a current component of the AC power signal passed through each of the switches;

generating the trip signal for any given switch if the current component of the AC power signal passed by the given switch exceeds a first predetermined current value for a first predetermined time value; and generating the trip signal for any given switch when a current component of the AC power signal passed by the given switch exceeds a second predetermined current value for a second predetermined time value, where the first predetermined current value is greater than the second predetermined current value and the second predetermined time value is greater than the first predetermined time value.

23. A method as recited in claim 20, further comprising the step of operating the given switch after the trip signal associated therewith has been generated to determine whether the fault condition exists in the discrete portion of the communications network associated with the given switch.

24. A power supply for a communications network, the power supply comprising:

power signal generating means for generating an AC power signal; and a plurality of power distribution circuits, where each power distribution circuit comprises switch means for passing the AC power signal to the communications network when a trip signal is not present and for disconnecting the power signal generating means from the communications network when the trip signal is present, first current limit means for monitoring the AC power signal passed by the switch means and generating the trip signal when a current component of the AC power signal passed by the switch means exceeds a first predetermined current value for a first predetermined time value, second current limit means for monitoring the AC power signal passed by the switch means and generating the trip signal when the current component of the AC power signal passed by the switch means exceeds a second predetermined current value for a second predetermined time value, and voltage limit means for generating the trip signal when the given AC power signal exceeds a first predetermined voltage value; wherein the first predetermined current value is greater than the second predetermined current value and the second predetermined time value is greater than the first predetermined time value.

25. A power node as recited in claim 24, in which:

the first current limit means comprises a first select means for adjusting the first predetermined current value; and the second current limit means comprises a second select means for adjusting the second predetermined current value.

* * * * *